(12) United States Patent
Moyer

(10) Patent No.: US 8,407,457 B2
(45) Date of Patent: Mar. 26, 2013

(54) SYSTEM AND METHOD FOR MONITORING DEBUG EVENTS

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 566 days.

(21) Appl. No.: 11/864,292

(22) Filed: Sep. 28, 2007

(65) Prior Publication Data

US 2009/0089547 A1  Apr. 2, 2009

(51) Int. Cl.
*G06F 9/00* (2006.01)
(52) U.S. Cl. .................................. 712/227
(58) Field of Classification Search .................. None
See application file for complete search history.

(56) References Cited

U.S. PATENT DOCUMENTS

| | | | |
|---|---|---|---|
| 5,257,358 A * | 10/1993 | Cohen | 714/38.12 |
| 5,367,550 A | 11/1994 | Ishida | |
| 5,850,562 A | 12/1998 | Crump et al. | |
| 5,889,981 A | 3/1999 | Betker et al. | |
| 5,943,498 A | 8/1999 | Yano et al. | |
| 6,016,555 A | 1/2000 | Deao et al. | |
| 6,035,422 A | 3/2000 | Hohl et al. | |
| 6,134,652 A | 10/2000 | Warren | |
| 6,158,023 A | 12/2000 | Ubukata et al. | |
| 6,321,331 B1 | 11/2001 | Roy et al. | |
| 6,356,960 B1 | 3/2002 | Jones et al. | |
| 6,389,557 B1 | 5/2002 | Yu et al. | |
| 6,591,378 B1 * | 7/2003 | Arends et al. | 714/38 |
| 6,708,270 B1 | 3/2004 | Mayer | |
| 6,862,694 B1 | 3/2005 | Tormey et al. | |
| 6,877,112 B1 | 4/2005 | Iino et al. | |
| 7,051,197 B2 | 5/2006 | Agarwala et al. | |
| 7,249,285 B2 | 7/2007 | Brock et al. | |
| 7,275,148 B2 | 9/2007 | Moyer et al. | |
| 7,334,161 B2 | 2/2008 | Williams et al. | |
| 7,444,504 B2 | 10/2008 | Agarwala et al. | |
| 2005/0188186 A1 | 8/2005 | Wolczko et al. | |

FOREIGN PATENT DOCUMENTS

| | | |
|---|---|---|
| JP | 62-239238 | 10/1987 |
| WO | 02/48888 A2 | 6/2002 |

OTHER PUBLICATIONS

Zhenyu, Liu et al.; "Implementation of precise exception in a 5-stage pipeline embedded processor"; Proceedings of 5th International Conference on ASIC; Oct. 21-24, 2003; pp. 447-451; IEEE.
PCT/US2008/072109; International Search Report and Written Opinion.
IBM; "PPC440x5 CPU Core User;s Manual"; Jul. 15, 2003; Title Pg. Copyright Pg, pp 3-13 (Table of Contents), pp. 188-192, pp. 213-243; IBM; USA.

(Continued)

*Primary Examiner* — Eddie P Chan
*Assistant Examiner* — John Lindlof
(74) *Attorney, Agent, or Firm* — Joanna G. Chiu; Robert L. King

(57) ABSTRACT

A system has a pipelined processor for executing a plurality of instructions by sequentially fetching, decoding, executing and writing results associated with execution of each instruction. Debug circuitry is coupled to the pipelined processor for monitoring execution of the instructions to determine when a debug event occurs. The debug circuitry generates a debug exception to interrupt instruction processing flow. The debug circuitry has control circuitry for indicating a number of instructions, if any, that complete instruction execution between an instruction that caused the debug event and a point in instruction execution when the exception is taken.

18 Claims, 14 Drawing Sheets

OTHER PUBLICATIONS

IBM Book E: Enhanced PowerPC Architecture; Mar. 15, 2001; Chapters 9 and 10; Version 0.99; IBM.
e200z6 PowerPC Core Reference Manual; 2004; Chapters 10 and 11; Freescale Semiconductor, Inc.

Office Action mailed Aug. 7, 2009 in U.S. Appl. No. 11/750,739.
Office Action mailed Jun. 18, 2010 in U.S. Appl. No. 12/016,664.
Office Action mailed Dec. 3, 2010 in U.S. Appl. No. 12/016,664.

* cited by examiner

| BIT(S) | NAME | DESCRIPTION | |
|---|---|---|---|
| 0 | EDM | EXTERNAL DEBUG MODE. THIS BIT IS READ-ONLY BY SOFTWARE.<br>0-EXTERNAL DEBUG MODE DISABLED. INTERNAL DEBUG EVENTS NOT MAPPED INTO EXTERNAL DEBUG EVENTS.<br>1-EXTERNAL DEBUG MODE ENABLED. EVENTS WILL NOT CAUSE THE CPU TO VECTOR TO INTERRUPT CODE. SOFTWARE IS NOT PERMITTED TO WRITE TO DEBUG REGISTERS {DBCRx, DBSR, DBCNT, IAC1-2, DAC1-2, DVC1-2}. | 52 |
| 1 | IDM | INTERNAL DEBUG MODE<br>0-DEBUG EXCEPTIONS ARE DISABLED. DEBUG EVENTS DO NOT AFFECT DBSR UNLESS EDM IS SET.<br>1-DEBUG EXCEPTIONS ARE ENABLED. ENABLED DEBUG EVENTS WILL UPDATE THE DBSR AND MAY CAUSE THE CPU TO VECTOR TO INTERRUPT CODE. SOFTWARE IS PERMITTED TO WRITE TO DEBUG REGISTERS. | 54 |
| 2:3 | – | RESERVED | 56 |
| 4 | ICMP | INSTRUCTION COMPLETE DEBUG EVENT ENABLE<br>0-ICMP DEBUG EVENTS ARE DISABLED<br>1-ICMP DEBUG EVENTS ARE ENABLED | 58 |
| 5 | BRT | BRANCH TAKEN DEBUG EVENT ENABLE<br>0-BRT DEBUG EVENTS ARE DISABLED<br>1-BRT DEBUG EVENTS ARE ENABLED | 60 |
| 6:7 | – | RESERVED | 61 |

*FIG. 5*

| BIT(S) | NAME | DESCRIPTION | |
|---|---|---|---|
| 8 | IAC1 | INSTRUCTION ADDRESS COMPARE 1 DEBUG EVENT ENABLE<br>0-IAC1 DEBUG EVENTS ARE DISABLED<br>1-IAC1 DEBUG EVENTS ARE ENABLED | 62 |
| 9 | IAC2 | INSTRUCTION ADDRESS COMPARE 2 DEBUG EVENT ENABLE<br>0-IAC2 DEBUG EVENTS ARE DISABLED<br>1-IAC2 DEBUG EVENTS ARE ENABLED | 64 |
| 10:11 | DAC1 | DATA ADDRESS COMPARE 1 DEBUG EVENT ENABLE<br>00-DAC1 DEBUG EVENTS ARE DISABLED<br>01-DAC1 DEBUG EVENTS ARE ENABLED ONLY FOR STORE-TYPE DATA STORAGE ACCESSES<br>10-DAC1 DEBUG EVENTS ARE ENABLED ONLY FOR LOAD-TYPE DATA STORAGE ACCESSES<br>11-DAC1 DEBUG EVENTS ARE ENABLED FOR LOAD-TYPE OR STORE-TYPE DATA STORAGE ACCESSES | 66 |
| 12:13 | DAC2 | DATA ADDRESS COMPARE 2 DEBUG EVENT ENABLE<br>00-DAC2 DEBUG EVENTS ARE DISABLED<br>01-DAC2 DEBUG EVENTS ARE ENABLED ONLY FOR STORE-TYPE DATA STORAGE ACCESSES<br>10-DAC2 DEBUG EVENTS ARE ENABLED ONLY FOR LOAD-TYPE DATA STORAGE ACCESSES<br>11-DAC2 DEBUG EVENTS ARE ENABLED FOR LOAD-TYPE OR STORE-TYPE DATA STORAGE ACCESSES | 68 |
| 14 | DVC1 | DATA VALUE COMPARE 1 QUALIFIER<br>0-DAC1 DEBUG EVENTS NOT AFFECTED BY DATA VALUE COMPARE<br>1-DAC1 DEBUG EVENTS ARE QUALIFIED BY DATA VALUE COMPARE | 70 |
| 15 | DVC2 | DATA VALUE COMPARE 2 QUALIFIER<br>0-DAC2 DEBUG EVENTS NOT AFFECTED BY DATA VALUE COMPARE<br>1-DAC2 DEBUG EVENTS ARE QUALIFIED BY DATA VALUE COMPARE | 72 |
| 16-31 | — | RESERVED | 73 |

*FIG. 6*

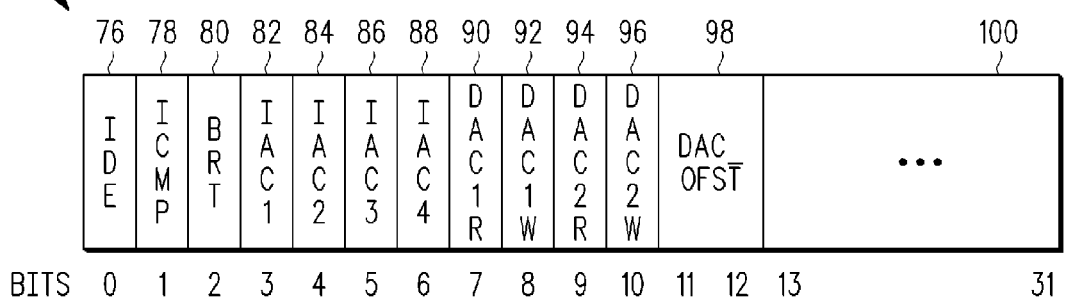

*FIG. 7*

| BIT(S) | NAME | DESCRIPTION | |
|---|---|---|---|
| 0 | IDE | IMPRECISE DEBUG EVENT<br>SET TO 1 IF DEBUG EXCEPTIONS ARE DISABLED AND A DEBUG EVENT CAUSES ITS RESPECTIVE DEBUG STATUS REGISTER BIT TO BE SET TO 1. | 76 |
| 1 | ICMP | INSTRUCTION COMPLETE DEBUG EVENT<br>SET TO 1 IF AN INSTRUCTION COMPLETE DEBUG EVENT OCCURRED. | 78 |
| 2 | BRT | BRANCH TAKEN DEBUG EVENT<br>SET TO 1 IF A BRANCH TAKEN DEBUG OCCURRED. | 80 |
| 3 | IAC1 | INSTRUCTION ADDRESS COMPARE 1 DEBUG EVENT<br>SET TO 1 IF AN IAC1 DEBUG EVENT OCCURRED. | 82 |
| 4 | IAC2 | INSTRUCTION ADDRESS COMPARE 2 DEBUG EVENT<br>SET TO 1 IF AN IAC2 DEBUG EVENT OCCURRED. | 84 |
| 5 | IAC3 | INSTRUCTION ADDRESS COMPARE 3 DEBUG EVENT<br>SET TO 1 IF AN IAC3 DEBUG EVENT OCCURRED. | 86 |
| 6 | IAC4 | INSTRUCTION ADDRESS COMPARE 4 DEBUG EVENT<br>SET TO 1 IF AN IAC4 DEBUG EVENT OCCURRED. | 88 |
| 7 | DAC1R | DATA ADDRESS COMPARE 1 READ DEBUG EVENT<br>SET TO 1 IF A READ-TYPE DAC1 DEBUG EVENT OCCURRED WHILE DBCR0[DAC1]=0b10 OR DBCR0[DAC1]=0b11 | 90 |
| 8 | DAC1W | DATA ADDRESS COMPARE 1 WRITE DEBUG EVENT<br>SET TO 1 IF A WRITE-TYPE DAC1 DEBUG EVENT OCCURRED WHILE DBCR0[DAC1]=0b01 OR DBCR0[DAC1]=0b11 | 92 |
| 9 | DAC2R | DATA ADDRESS COMPARE 2 READ DEBUG EVENT<br>SET TO 1 IF A READ-TYPE DAC2 DEBUG EVENT OCCURRED WHILE DBCR0[DAC2]=0b10 OR DBCR0[DAC2]=0b11 | 94 |
| 10 | DAC2W | DATA ADDRESS COMPARE 2 WRITE DEBUG EVENT<br>SET TO 1 IF A WRITE-TYPE DAC2 DEBUG EVENT OCCURRED WHILE DBCR0[DAC2]=0b01 OR DBCR0[DAC2]=0b11 | 96 |
| 11:12 | DAC_OFST | DATA ADDRESS COMPARE OFFSET<br>INDICATES OFFSET-1 OF SAVED DSRR0 VALUE FROM THE ADDRESS OF THE LOAD OR STORE INSTRUCTION WHICH TOOK A DAC DEBUG EXCEPTION, UNLESS A SIMULTANEOUS DTLB OR DSI ERROR OCCURS, IN WHICH CASE THIS FIELD IS SET TO 0b00 AND DBSR[IDE] IS SET TO 1. NORMALLY SET TO 0b00. A DVC DAC WILL SET THIS FIELD TO 0b01, 0b10, OR 0b11. | 98 |
| 13-31 | - | RESERVED | 100 |

*FIG. 8*

| 1ST LOAD/STORE CLASS INSTRUCTION (I0) | 2ND INSTRUCTION (LOAD/STORE CLASS UNLESS OTHERWISE SPECIFIED) (I1) | 3RD INSTRUCTION (LOAD/STORE CLASS UNLESS OTHERWISE SPECIFIED) (I2) | RESULT |
|---|---|---|---|
| DTLB ERROR, NO DAC | – | – | TAKE DTLB EXCEPTION, NO DBSR UPDATE. |
| DSI, NO DAC | – | – | TAKE DSI EXCEPTION, NO DBSR UPDATE. |
| DTLB ERROR, WITH DACx | – | – | TAKE DEBUG EXCEPTION, DBSR UPDATE SETTING DACx AND IDE, DAC_OFST SET TO 0b00. DSRR0 POINTS TO 1ST LOAD/STORE CLASS INSTRUCTION. |
| DSI, WITH DACx | – | – | TAKE DEBUG EXCEPTION, DBSR UPDATE SETTING DACx AND IDE, DAC_OFST SET TO 0b00. DSRR0 POINTS TO 1ST LOAD/STORE CLASS INSTRUCTION. |
| DACx | – | – | TAKE DEBUG EXCEPTION, DBSR UPDATE SETTING DACx, DAC_OFST SET TO 0b00. DSRR0 POINTS TO 2ND LOAD/STORE CLASS INSTRUCTION. |
| DVCx DACx | NO EXCEPTIONS, ANY INSTRUCTION | NO EXCEPTIONS, NON-LD/ST INSTRUCTION | TAKE DEBUG EXCEPTION, DBSR UPDATE SETTING DACx, DAC_OFST SET TO 0b01. DSRR0 POINTS TO 3RD INSTRUCTION. |
| DVCx DACx (FIG. 9) | NO EXCEPTIONS | NO EXCEPTIONS, LD/ST INSTRUCTION | TAKE DEBUG EXCEPTION, DBSR UPDATE SETTING DACx, DAC_OFST SET TO 0b10. DSRR0 POINTS TO INSTRUCTION AFTER 3RD INSTRUCTION. |
| DVCx DACx (FIG. 11) | DTLB ERROR, NO DAC | – | TAKE DEBUG EXCEPTION, DBSR UPDATE SETTING DACx, DAC_OFST SET TO 0b00. DSRR0 POINTS TO 2ND LOAD/STORE CLASS INSTRUCTION. NOTE: IN THIS CASE THE 2ND LD/ST EXCEPTION IS MASKED. THIS BEHAVIOR IS IMPLEMENTATION DEPENDENT AND MAY DIFFER ON OTHER PROCESSORS. |

*FIG. 12*

| | 1ST LOAD/STORE CLASS INSTRUCTION (I0) | 2ND INSTRUCTION (LOAD/STORE CLASS UNLESS OTHERWISE SPECIFIED) (I1) | 3RD INSTRUCTION (LOAD/STORE CLASS UNLESS OTHERWISE SPECIFIED) (I2) | RESULT |
|---|---|---|---|---|
| 209 | DVCx DACx | DSI, NO DAC | - | TAKE DEBUG EXCEPTION, DBSR UPDATE SETTING DACx, DAC_OFST SET TO 0b00. DSRR0 POINTS TO 2ND LOAD/STORE CLASS INSTRUCTION.<br>NOTE: IN THIS CASE THE 2ND LD/ST EXCEPTION IS MASKED. THIS BEHAVIOR IS IMPLEMENTATION DEPENDENT AND MAY DIFFER ON OTHER PROCESSORS. |
| 210 | DVCx DACx | DTLB ERROR, WITH DACy | - | TAKE DEBUG EXCEPTION, DBSR UPDATE SETTING DACx. DAC_OFST SET TO 0b00. DSRR0 POINTS TO 2ND LOAD/STORE CLASS INSTRUCTION.<br>NOTE: IN THIS CASE THE 2ND LD/ST EXCEPTION IS MASKED. THIS BEHAVIOR IS IMPLEMENTATION DEPENDENT AND MAY DIFFER ON OTHER PROCESSORS. |
| 211 | DVCx DACx | DSI, WITH DACy | - | TAKE DEBUG EXCEPTION, DBSR UPDATE SETTING DACx. DAC_OFST SET TO 0b00. DSRR0 POINTS TO 2ND LOAD/STORE CLASS INSTRUCTION.<br>NOTE: IN THIS CASE THE 2ND LD/ST EXCEPTION IS MASKED. THIS BEHAVIOR IS IMPLEMENTATION DEPENDENT AND MAY DIFFER ON OTHER PROCESSORS. |
| 212 | DVCx DACx | DACy | - | TAKE DEBUG EXCEPTION, DBSR UPDATE SETTING DACx, DACy. DAC_OFST SET TO 0b01. DSRR0 POINTS TO 3RD INSTRUCTION.<br>NOTE: IN THIS CASE IF X==Y, THEN THE RESULTANT STATE OF DBSR AND DSRR0 MAY BE INDISTINGUISHABLE FROM THE "NO DACy" CASE. |

*FIG. 13*

| | 1ST LOAD/STORE CLASS INSTRUCTION (I0) | 2ND INSTRUCTION (LOAD/STORE CLASS UNLESS OTHERWISE SPECIFIED) (I1) | 3RD INSTRUCTION (LOAD/STORE CLASS UNLESS OTHERWISE SPECIFIED) (I2) | RESULT |
|---|---|---|---|---|
| 213 | DVCx DACx | DVCy DACy, NORMAL LD/ST | NON-LD/ST INSTRUCTION | TAKE DEBUG EXCEPTION, DBSR UPDATE SETTING DACx, DACy. DAC_OFST SET TO 0b01. DSRR0 POINTS TO 3RD INSTRUCTION.<br>NOTE: IN THIS CASE IF X==Y, THEN THE RESULTANT STATE OF DBSR AND DSRR0 MAY BE INDISTINGUISHABLE FROM THE "NO DACy" CASE. |
| 214 | DVCx DACx | DVCy DACy, NORMAL LD/ST | LD/ST INSTRUCTION, NO EXCEPTION | TAKE DEBUG EXCEPTION, DBSR UPDATE SETTING DACx, DACy. DAC_OFST SET TO 0b10. DSRR0 POINTS TO INSTRUCTION AFTER THE 3RD LOAD/STORE CLASS INSTRUCTION.<br>NOTE: IN THIS CASE IF X==Y, THEN THE RESULTANT STATE OF DBSR AND DSRR0 MAY BE INDISTINGUISHABLE FROM THE "NO DACy" CASE. |
| 215 | DVCx DACx | DVCy DACy, NORMAL LD/ST | DSI, WITH OR WITHOUT DAC | TAKE DEBUG EXCEPTION, DBSR UPDATE SETTING DACx, DACy. DAC_OFST SET TO 0b01. DSRR0 POINTS TO 3RD INSTRUCTION.<br>NOTE: IN THIS CASE IF X==Y, THEN THE RESULTANT STATE OF DBSR AND DSRR0 MAY BE INDISTINGUISHABLE FROM THE "NO DACy" CASE.<br>NOTE: IN THIS CASE THE 3RD LD/ST EXCEPTION IS MASKED. THIS BEHAVIOR IS IMPLEMENTATION DEPENDENT AND MAY DIFFER ON OTHER PROCESSORS. |

*FIG. 14*

| | 1ST LOAD/STORE CLASS INSTRUCTION (I0) | 2ND INSTRUCTION (LOAD/STORE CLASS UNLESS OTHERWISE SPECIFIED) (I1) | 3RD INSTRUCTION (LOAD/STORE CLASS UNLESS OTHERWISE SPECIFIED) (I2) | RESULT |
|---|---|---|---|---|
| 216 | DVCx DACx | DVCy DACy, NORMAL LD/ST | DTLB, WITH OR WITHOUT DAC | TAKE DEBUG EXCEPTION, DBSR UPDATE SETTING DACx, DACy. DAC_OFST SET TO 0b01. DSRR0 POINTS TO 3RD INSTRUCTION. NOTE: IN THIS CASE IF X==Y, THEN THE RESULTANT STATE OF DBSR AND DSRR0 MAY BE INDISTINGUISHABLE FROM THE "NO DACy" CASE. NOTE: IN THIS CASE THE 3RD LD/ST EXCEPTION IS MASKED. THIS BEHAVIOR IS IMPLEMENTATION DEPENDENT AND MAY DIFFER ON OTHER PROCESSORS. |
| 217 | DVCx DACx | DVCy DACy, NORMAL LD/ST | DACy, OR DVCy DACy NORMAL LD/ST OR MULTIPLE WORD LD/ST | TAKE DEBUG EXCEPTION, DBSR UPDATE SETTING DACx, DACy. DAC_OFST SET TO 0b10. DSRR0 POINTS TO INSTRUCTION AFTER THE 3RD LOAD/STORE CLASS INSTRUCTION. NOTE: IN THIS CASE IF X==Y, THEN THE RESULTANT STATE OF DBSR AND DSRR0 MAY BE INDISTINGUISHABLE FROM THE "NO DACy" CASE. |
| 218 | DVCx DACx | DVCy DACy, LD/ST MULTIPLE (LMW, STMW) | ANY INSTRUCTION INCLUDING LD/ST | TAKE DEBUG EXCEPTION, DBSR UPDATE SETTING DACx, DACy. DAC_OFST SET TO 0b01. DSRR0 POINTS TO 3RD INSTRUCTION. NOTE: IN THIS CASE IF X==Y, THEN THE RESULTANT STATE OF DBSR AND DSRR0 MAY BE INDISTINGUISHABLE FROM THE "NO DACy" CASE. |

*FIG. 15*

| | 1ST LOAD/STORE CLASS INSTRUCTION (I0) | 2ND INSTRUCTION (LOAD/STORE CLASS UNLESS OTHERWISE SPECIFIED) (I1) | 3RD INSTRUCTION (LOAD/STORE CLASS UNLESS OTHERWISE SPECIFIED) (I2) | RESULT |
|---|---|---|---|---|
| 219 | DVCx DACx (FIG. 10) | ANY INSTRUCTION (NO EXCEPTION) | DSI, WITH OR WITHOUT DAC, NORMAL LD/ST OR MULTIPLE WORD LD/ST | TAKE DEBUG EXCEPTION, DBSR UPDATE SETTING DACx, DACy. DAC_OFST SET TO 0b01. DSRR0 POINTS TO 3RD INSTRUCTION. NOTE: IN THIS CASE THE 3RD LD/ST EXCEPTION IS MASKED. THIS BEHAVIOR IS IMPLEMENTATION DEPENDENT AND MAY DIFFER ON OTHER PROCESSORS. |
| 220 | DVCx DACx | ANY INSTRUCTION (NO EXCEPTION) | DACy, OR DVCy DACy NORMAL LD/ST OR MULTIPLE WORD LD/ST | TAKE DEBUG EXCEPTION, DBSR UPDATE SETTING DACx, DACy. DAC_OFST SET TO 0b10. DSRR0 POINTS TO INSTRUCTION AFTER THE 3RD CLASS INSTRUCTION. NOTE: IN THIS CASE IF X==Y, THEN THE RESULTANT STATE OF DBSR AND DSRR0 MAY BE INDISTINGUISHABLE FROM THE "NO DACy" CASE. |

| 76 | 78 | 80 | 82 | 84 | 86 | 88 | 90 | 92 | 94 | 96 | 102 | 104 | 106 | 108 | 110 |
|---|---|---|---|---|---|---|---|---|---|---|---|---|---|---|---|
| IDE | ICMP | BRT | IAC1 | IAC2 | IAC3 | IAC4 | DAC1R | DAC1W | DAC2R | DAC2W | DAC_OFSTA | OCCA | DAC_OFSTB | OCCB | ... |
| BITS 0 | 1 | 2 | 3 | 4 | 5 | 6 | 7 | 8 | 9 | 10 | 11  12 | 13 | 14  15 | 16 | 17    31 |

*FIG. 17*

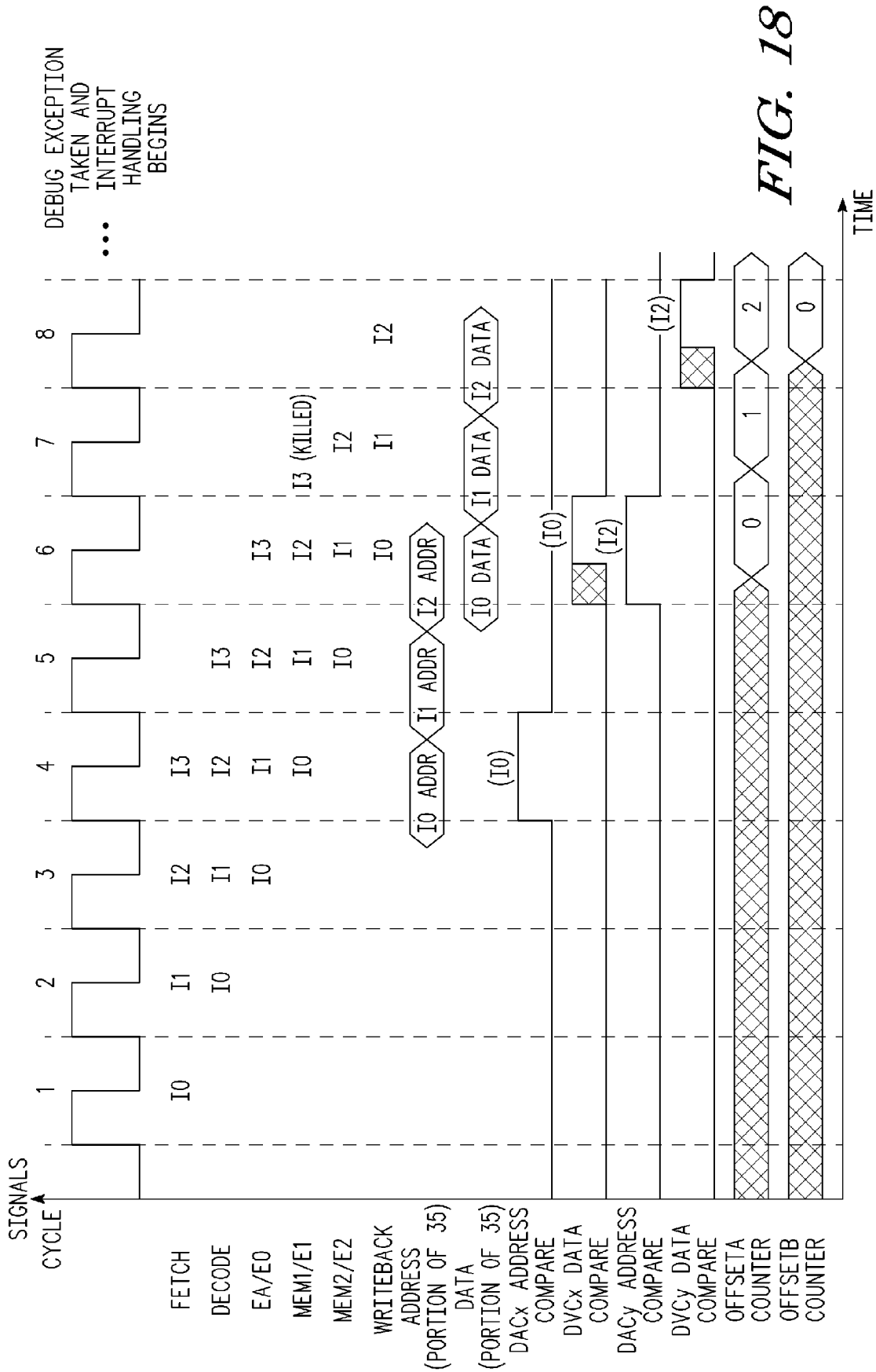

SYSTEM AND METHOD FOR MONITORING DEBUG EVENTS

BACKGROUND

1. Field

This disclosure relates generally to data processing systems, and more specifically, to a system and method for monitoring debug events.

2. Related Art

Data value breakpoints involve comparing both a data access address, as well as the data associated with the data access address, in order to determine whether a breakpoint exception should be generated. However, as in typical pipelined processors, data may not be available until many cycles after an access address is available. Therefore, there is uncertainty about where exactly the breakpoint happened in the instruction stream, since one or more instructions following the data access may be executed in the interval in which the access data is not yet available. In one data processing system available today, additional stalls are added to the natural execution in order to prevent any instructions from executing in the interval in which the access data is not yet available. However, this requires additional overhead and perturbs normal execution timing, which may be undesirable during debug.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIGS. 5 and 6 show, in a tabular form, functionality of a portion of the debug control register of FIG. 4, in accordance with one embodiment of the present invention.

FIG. 7 is a diagram of a debug status register associated with the debug registers of FIG. 3, in accordance with one embodiment of the present invention.

FIG. 8 shows, in a tabular form, functionality of a portion of the debug status register of FIG. 7, in accordance with one embodiment of the present invention.

FIGS. 12-16 show, in tabular form, various exemplary data address compare (DAC) events and their corresponding results.

FIG. 17 is a diagram of a debug status register associated with the debug registers of FIG. 3, in accordance with one embodiment of the present invention.

FIG. 18 illustrates a timing diagram illustrating an example of operation of the processor of FIG. 2.

DETAILED DESCRIPTION

Figure 1:
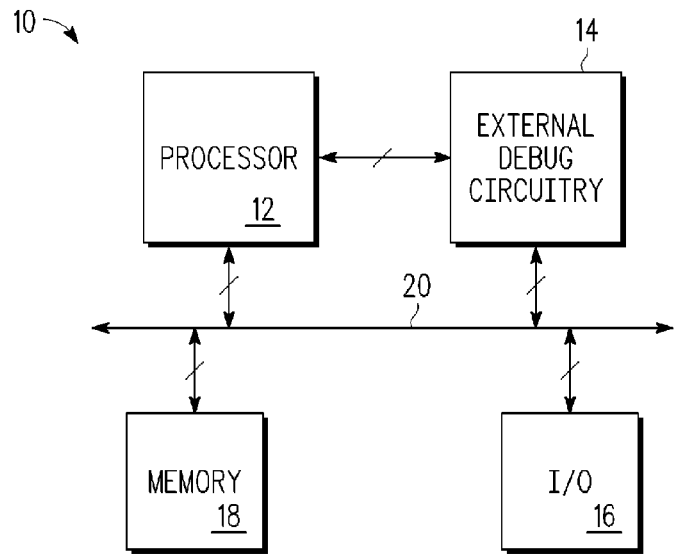
FIG. 1 is a block diagram of a data processing system, in accordance with one embodiment of the present invention.

When debugging code, it is often difficult to know which instructions actually resulted in a debug exception being taken. For example, in the case of data value breakpoints, both a data access address comparison and a data value comparison with the accessed data are performed, and a comparison result may trigger a debug exception which interrupts normal instruction stream execution. Data may be returned for an access many cycles following the initiation of the access, which is triggered by supplying a data access request and the access address. The lag between a data address compare on the requested access and a data value compare on the received data may make it especially difficult to determine which instruction in the instruction stream actually resulted in the instruction stream interrupt. In one embodiment, an offset value may be used to indicate how many instructions have executed between the instruction which caused the data value breakpoint and the point in the instruction stream at which the breakpoint exception is actually taken. In this manner, improved debug functionality may be achieved.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" or "0b" preceding a number indicates that the number is represented in its binary or base two form.

FIG. 1 illustrates a data processing system 10 consistent with an embodiment of the invention. Data processing system may be a system-on-chip. Data processing system 10 may be implemented on a single integrated circuit or on a plurality of integrated circuits. Data processing system 10 includes a processor 12, an external debug circuitry 14, an I/O module 16, and a memory 18, which may be coupled via bus 20. In alternate embodiments, memory 18 may be any type of memory and may be located on the same integrated circuit as processor 12, or on a different integrated circuit than processor 12. Memory 18 may be any type of memory, such as, for example, a read only memory (ROM), a random access memory (RAM), non-volatile memory (e.g. Flash), etc. Also, memory 18 may be a memory or other data storage located within another peripheral or slave or on a different integrated circuit.

Figure 2:
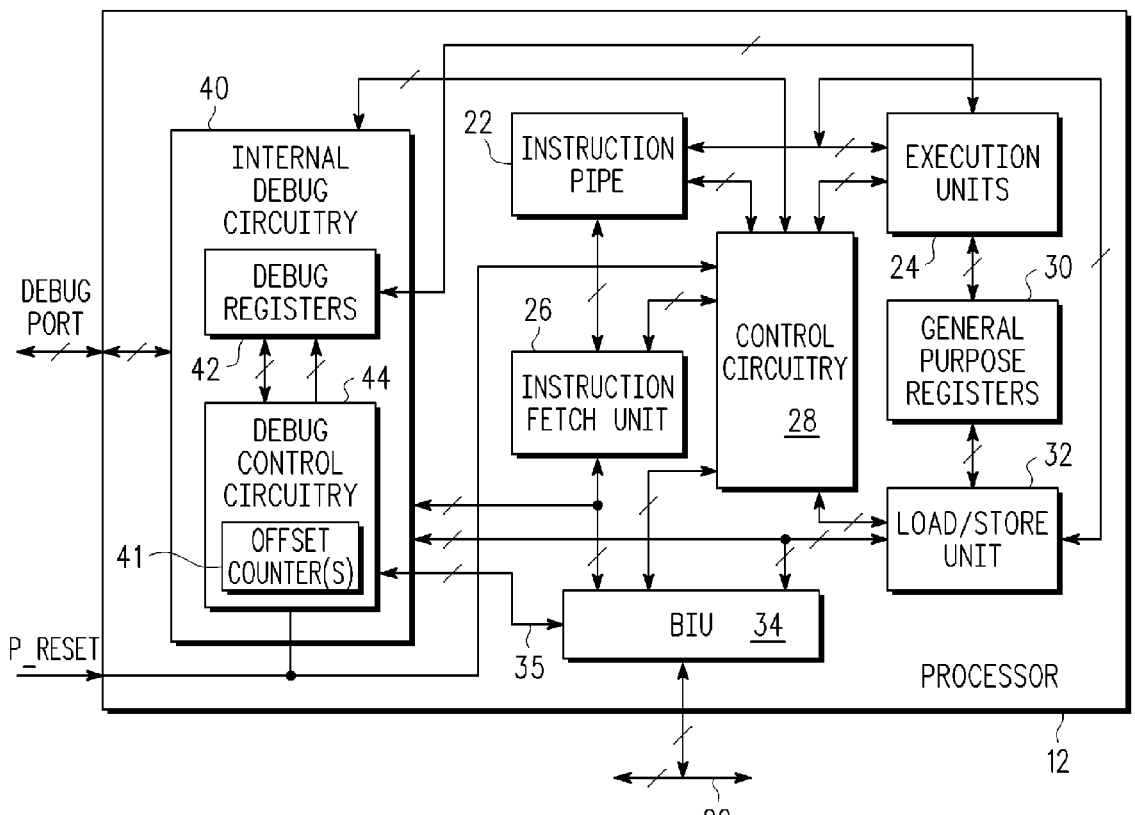
FIG. 2 is a block diagram of a processor associated with the data processing system of FIG. 1, in accordance with one embodiment of the present invention.

FIG. 2 is a block diagram of processor 12 associated with data processing system 10 of FIG. 1. Processor 12 may include an instruction pipe 22, execution units 24, instruction fetch unit 26, control circuitry 28, general purpose registers 30, load/store unit 32, bus interface unit (BIU) 34 and internal debug circuitry 40. Processor 12 may communicate with other components of data processing system 10 via bus 20 coupled to BIU 34. Internal debug circuitry 40 may be coupled to external debugging units, such as an IEEE ISTO-5001 compliant Nexus™ debugging unit via debug port shown in FIG. 2. Nexus™ is a trademark of Freescale Semiconductor, Inc. located in Austin, Tex. Debug port may be a serial interface, such as JTAG, or may be implemented as a parallel port, a combination of serial and parallel ports, or as an Ethernet port. Internal debug circuitry 40 may include debug registers 42 and debug control circuitry 44. Debug control circuitry 44 may include one or more offset counters 41 which may be used to determine a number of instructions, if any, that complete instruction execution between an instruction that caused a debug event and a point in instruction execution when the debug event is processed. Debug registers 42 may include bits grouped in fields for controlling various debug related events, including instruction breakpoints, data breakpoints, watchpoints, and other messaging associated with debugging. These debugging resources may be shared between processor 12 and external debug circuitry 14. Also, debug control circuitry 44 may communicate addresses and data with BIU 34 by way of conductors 35.

Figure 3:
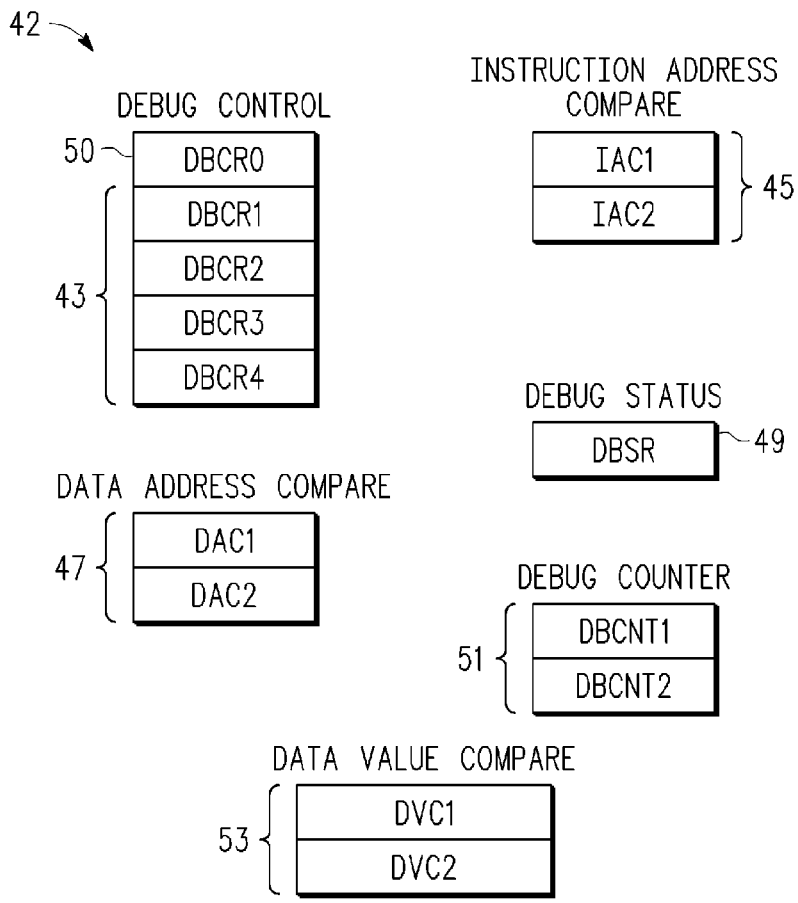
FIG. 3 is a diagram illustrating exemplary debug registers associated with the data processing system of FIG. 1.

Referring now to FIG. 3, registers within debug registers 42 may also be provided for storing one or more address comparison values, address ranges, and data match values for implementing instruction and/or data access breakpoint and watchpoint events, and other debug control criteria. These address and data values, along with various control criteria, are used to determine when processor 12 accesses one or more predetermined instruction addresses or data addresses for the purpose of generating a breakpoint or watchpoint event, which can cause processor 12 to begin exception processing for a debug exception when internal debug mode is active, or cause processor 12 to enter a debug halted mode in which it responds to commands provided by external debug circuitry 14 through the debug port of internal debug unit 40 when external debug mode is active. By way of example, debug registers 42 may include various debug control registers, including debug control register 50 (DBCR0) and other debug control registers 43 (DBCR1, DBCR2, DBCR3, and DBCR4). Debug registers 42 may further include instruction address compare registers 45 (IAC1 and IAC2). Instruction address compare registers 45 may store instruction addresses for address comparison purposes. Debug registers 42 may further include data address compare registers 47 (DAC1 and DAC2). Data address compare registers 47 may store data access addresses for address comparison purposes. Debug registers 42 may further include debug status register 49, debug counters 51 (DBCNT1 and DBCNT2), and data value compare registers 53 (DVC1 and DVC2). Debug registers 42 may be a part of the user's software programming model. Debug counters 51 may be configured to count-down when one ore more count-enabled events occur. When a count value reaches zero, a debug count event may be signaled, and a debug interrupt may be generated, if enabled. Data value compare registers 53 may store data values for data comparison purposes.

In internal debug mode, these register resources are managed by software, and no external debug circuitry usage is required. Software may configure the registers through data movement using move to and from special purpose register instructions which are programmers model software instructions to initialize the individual debug registers for performing software-based debugging activities, in which enabled debug events cause software debug interrupts to occur. A software interrupt handler may then perform various desired activity which is determined by the software programmer of data processing system 10. In external debug mode, external debug circuitry 14 is assigned ownership of these shared debug event configuration registers, and when a configured debug event occurs, processor 12 may enter a halted state and wait for a command to be provided by external debug circuitry 14. Software no longer has control of the shared debug resources when external debug mode is enabled. External debug circuitry 14 may access the shared debug resources, including debug registers 42 directly via the debug port (as shown in FIG. 2), which may be, for example, implemented as a JTAG TAP port. In one embodiment, debug registers 42 may be mapped as JTAG data registers with register selection encodings contained within one or more fields for the various JTAG instructions, which provide for read and write accesses to the registers by the debugger through JTAG IR and DR operations.

Sharing of a single set of registers requires fewer processor 12 resources to be implemented, and this simplifies the programming model for the user of data processing system 10. Internal debug unit 40 monitors activity within processor 12 and in response to detecting one or more predetermined conditions based on stored debug configuration information, may generate one or more data breakpoint events, instruction breakpoint events, instruction execution events such as a branch or trap taken event, an instruction completion event, and the like. In this manner of operation, processor 12 functions as can be appreciated by those skilled in the art.

Figure 4:
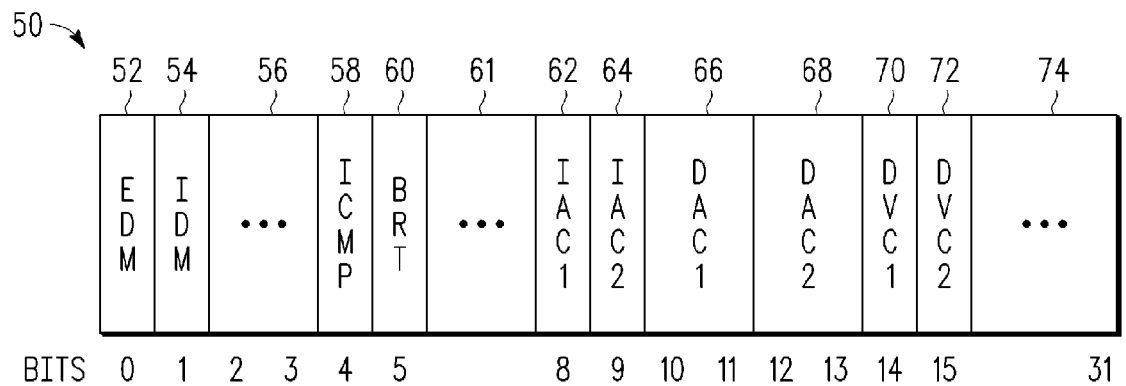
FIG. 4 is a diagram of a debug control register associated with the debug registers of FIG. 3, in accordance with one embodiment of the present invention.

FIG. 4 is a diagram of a debug control register 50 associated with the data processing system of FIG. 1. Debug control register 50 may be included as part of debug registers 42, which may further be included as part of internal debug unit 40. Debug control register 50 may be used to store debug configuration information. Although FIG. 4 illustrates a specific embodiment of the present invention which uses specific bit fields, alternate embodiments of the present invention may use different bit fields having different numbers of bits in each field. The specific bit fields depicted in FIG. 4 are shown only for illustrative purposes. By way of example, debug control register 50 may include 32 bits. Debug control register 50 may include bit fields labeled as: EDM 52, IDM 54, ICMP 58, BRT 60, IAC1 62, IAC2 64, DAC1 66, DAC2 68, DVC1 70, and DVC2 72. These bit fields are merely exemplary and debug control register 50 may include fewer or additional bit fields. In addition, these bit fields may be arranged differently. Debug control register 50 may also include reserved bit fields 56, 61, and 74, which may be used in the future. The functionality of the various bit fields is explained with respect to FIGS. 5 and 6 below. By way of example, debug control register 50 may be a writeable register that may also be readable and which may be part of the user's software programming model. In alternate embodiments of the present invention, debug control register 50 may not be a control register in the user's software programming model, but instead may be implemented outside of the user's software programming model. Any type of storage circuitry may be used to implement debug control register 50.

FIG. 5 shows, in a tabular form, functionality of a portion of debug control register 50 of FIG. 4. EDM bit 52 may indicate whether the external debug mode is enabled or disabled. When EDM bit 52 is set to 1, for example, control registers, such as debug control register 50 are placed under exclusive control of external debug circuitry 14 and data processing system 10 software cannot write information to these control registers. Alternatively, when EDM bit 52 is set to 1, software cannot write to specific portions of debug control registers. Thus, EDM bit 52 is used to selectively block certain reset events from clearing information stored in debug control register 50 and other debug resources, which may contain debug control and setup information. IDM bit 54 may indicate whether internal debug mode is enabled or disable, thus indicating whether debug exceptions are enabled or disabled. ICMP bit 58 may be used to indicate whether instruction complete debug events are enabled or disabled. BRT bit 60 may be used to indicate whether branch taken debug events are enabled or disabled. Bits 6:7 61 may be reserved for future use. With reference now to FIG. 6, FIG. 6 shows, in a tabular form, functionality of a portion of the debug control register 50 of FIG. 4. IAC1 bit 62 may be used to indicate whether instruction address compare 1 debug events are enabled or disabled. IAC2 bit 62 may be used to indicate whether instruction address compare 2 debug events are enabled or disabled. DAC1 bits 66 may be used to indicate whether data address compare 1 debug events are enabled or disabled. If enabled, DAC1 bits 66 also indicates for which type of storage accesses data address compare 1 debug events are enabled (for example, for store-type data storage accesses, for load-type data storage accesses, or for either load-type or store-type data storage accesses). DAC2 bits 68 may be used to indicate whether data address compare 2 debug events are enabled or disabled. If enabled, DAC2 bits 68 also indicates for which type of storage accesses data address compare 1 debug events are enabled (for example, for store-type data storage accesses, for load-type data storage accesses, or for either load-type or store-type data storage accesses). DVC1 bits 70 may be used to indicate whether a data value compare 1 qualifier is enabled or not. DVC2 bits 72 may be used to indicate whether a data value compare 2 qualifier is enabled or not. Bits 16:31 may be reserved for future use. Although FIGS. 5 and 6 describe a specific number of bit fields for providing different configuration information associated with debug events, different number of bit fields than shown in these figures may also be used.

FIG. 7 is a diagram of a debug status register 49 associated with the data processing system of FIG. 1. Debug status register 49 may be included as part of debug registers 42, which may further be included as part of internal debug unit 40. Debug status register 49 may be used to store status information on debug events. Although FIG. 7 illustrates a specific embodiment of the present invention which uses specific bit fields, alternate embodiments of the present invention may use different bit fields having different numbers of bits in each field. The specific bit fields depicted in FIG. 7 are shown only for illustrative purposes. By way of example, debug status register 49 may include 32 bits. Debug status register 49 may include bit fields labeled as: IDE 76, ICMP 78, BRT 80, IAC1 82, IAC2 84, IAC3 86, IAC4 88, DAC1R 90, DAC1W 92, DAC2R 94, DAC2W 96, and DAC_OFST 98. These bit fields are merely exemplary and debug status register 49 may include fewer or additional bit fields. In addition, these bit fields may be arranged differently. Debug status register 49 may also include reserved bit fields 100, which may be used in the future. The functionality of the various bit fields is explained with respect to FIG. 8 below. Also, in referring to debug status register 49, setting a bit refers to storing a logic level one and clearing a bit refers to storing a logic level zero. By way of example, debug status register 49 may be a register whose bits are set via hardware, and read and cleared via software and which may be part of the user's software programming model. In alternate embodiments of the present invention, debug status register 49 may not be in the user's software programming model, but instead may be implemented outside of the user's software programming model. In one embodiment, debug status bits of debug status register 49 are set by debug events only while internal debug mode is enabled or external debug mode is enabled. Also, in one embodiment, when debug interrupts are enabled, a set bit in debug status register 49 may cause a debug interrupt to be generated, where the debug interrupt handler is responsible for clearing debug status register 49 bits prior to returning to normal execution. Furthermore, any type of storage circuitry may be used to implement debug status register 49.

FIG. 8 shows, in a tabular form, functionality of debug status register 49 of FIG. 7. IDE bit 76 is used to indicate occurrence of an imprecise debug event and thus may be set to one if debug exceptions are disabled and a debug event causes its respective debug status register bit to be set to one. That is, although a debug event may occur, debug exceptions may remain disabled because an interrupt cannot yet occur due to a current state of the pipeline. ICMP bit 78 may be set to one if an instruction complete debug event occurred. BRT bit 80 may be set to one if a branch taken debug event occurred. IAC1 bit 82 may be set to one if an IAC1 debug event occurred. IAC2 bit 84 may be set to one if an IAC2 debug event occurred. IAC3 bit 86 may be set to one if an IAC3 debug event occurred. IAC4 bit 88 may be set to one if an IAC4 debug event occurred. DAC1R bit 90 may be set to one if a read-type DAC1 debug event occurred while DAC1 bits 66 equal %10 or %11 (indicating that DAC1 debug events are enabled for load-type data storage accesses, as shown in FIG. 6). DAC1W bit 92 may be set to one if a write-type DAC1 debug event occurred while DAC1 bits 66 equal %01 or %11 (indicating that DAC1 debug events are enabled for store-type data storage accesses, as shown in FIG. 6). DAC2R bit 94 may be set to one if a read-type DAC2 debug event occurred while DAC2 bits 68 equal %10 or %11 (indicating that DAC2 debug events are enabled for load-type data storage accesses, as shown in FIG. 6). DAC2W bit 96 may be set to one if a write-type DAC2 debug event occurred while DAC2 bits 68 equal %01 or %11 (indicating that DAC2 debug events are enabled for store-type data storage accesses, as shown in FIG. 6). DAC_OFST bits 98 may be used to indicate a data address compare offset. In one embodiment, bits 13 to 31 are reserved for possible future use.

If a data value compare qualifier is indicated for DAC1 or DAC2 in debug control register 50, then a data access address match as well as a data value match (for the data value associated with the data access address) must occur for a DVC1 DAC1 or a DVC2 DAC2 debug event to be indicated. That is, the respective one of DAC1R bit 90, DAC1W bit 92, DAC2R bit 94, and DAC2W bit 96 is not set to indicate a DVC1 DAC1 or a DVC2 DAC2 debug event until a data value match occurs as well. Note that the values to be matched can be stored in debug registers 42, such as in data address compare registers 47 and data value compare registers 53. For example, if DVC1 bit 70 of debug control register 50 is set, then DAC1 debug events are qualified by a data value compare, meaning that for a DVC1 DAC1 debug event to be indicated, the address must match the DAC1 data address compare register and the associated data value for that address must match the DVC1 data value compare register. However, due to the pipelined nature of processor 12, data may not be available for comparison until many cycles after an access address is available. Furthermore, even once the data is available and a DVC DAC is indicated, the instruction stream may not be interruptible at that moment (that is, debug exceptions may be disabled) meaning that the actual data value breakpoint may not be taken at the moment a DVC DAC is indicated. In this case, the IDE bit 76 can be set to 1 to indicate an imprecise debug event in which a debug exception cannot be taken at the time a debug event is indicated. That is, the actual data value breakpoint cannot be taken until debug exceptions are enabled, which may occur at different (and unpredictable) points in the subsequent instruction stream, as will be discussed in reference to FIGS. 9-11. Once a debug exception is taken, interrupt handling begins and the debug event is processed.

DAC_OFST bits 98 may therefore be used to indicate a number of instructions that have executed between the instruction which caused a DVC DAC to be indicated and the point at which a data value breakpoint occurs and a debug exception is taken. DAC_OFST bits 98 may be used to store the "offset-1" of the saved DSRR0 value from the address of the load or store instruction which took a data address compare debug exception. Note that DSRR0 corresponds to debug save restore register 0, and the saved DSRR0 value corresponds to the return pointer for a breakpoint interrupt. Therefore, if a data value breakpoint occurs, the saved DSRR0 address value corresponds to the address value of the instruction following the last instruction executed prior to interrupt handling. In this manner, it can be determined how many instructions have executed within the interval between the address which caused the DVC1 DAC1 and the point at which the instruction stream is interrupted to take the data value breakpoint. This allows a user to determine which instruction was actually the one which caused the data value breakpoint. In one embodiment, DAC_OFST bits 98 is normally set to %00, and a DVC DAC will set this field to %01, %10, or %11, which represents the "offset-1". Examples will be provided below with respect to FIGS. 9-11. However, note that if a simultaneous translation look-aside buffer miss (also referred to as a DTLB error) or data storage interrupt (e.g. DSI) error occurs due to an access permissions error or other access-related error, DAC_OFST bits 98 may be set to %00 and IDE bit 76 may be set to 1. In these cases, note that the data associated with the address may not ever be available due to one of these errors occurring.

Figure 9:
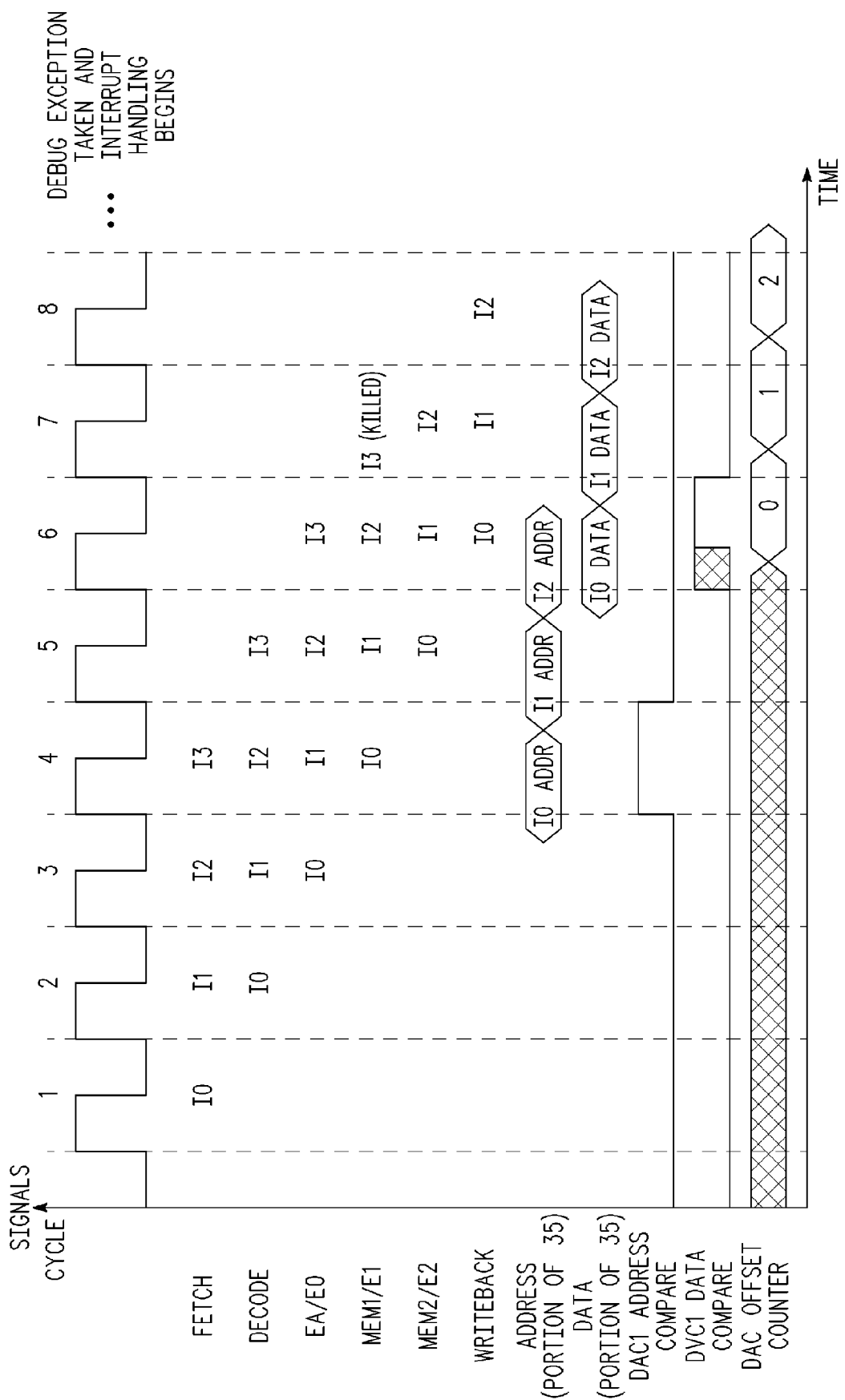
FIGS. 9-11 illustrate timing diagrams illustrating different examples of operation of the processor of FIG. 2.
Figure 10:
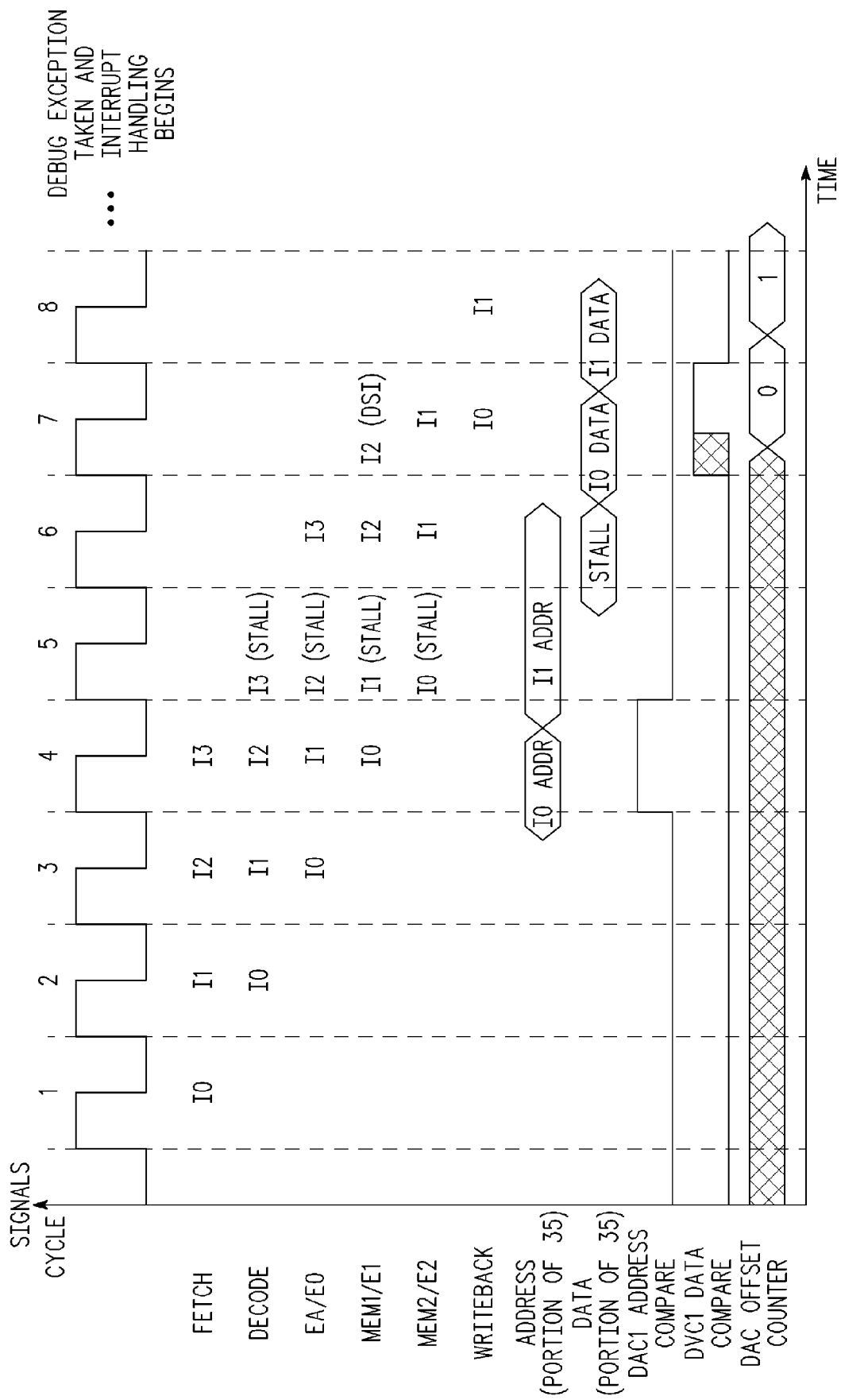
Figure 11:
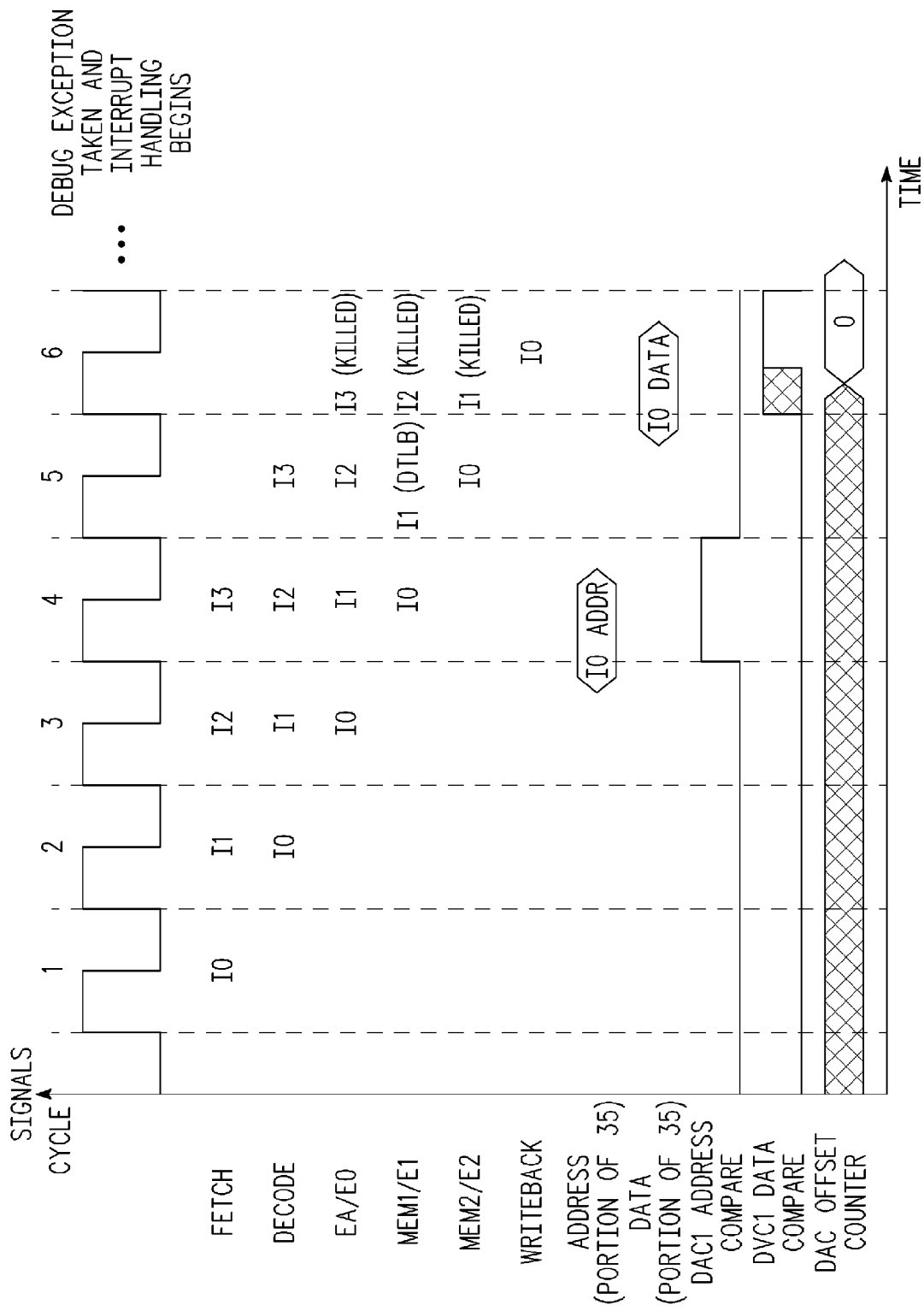

Different situations and conditions can affect the number of instructions executed between the time the data address compare is performed and the time at which the data value breakpoint is actually taken. FIGS. 9-11 illustrate timing diagrams which illustrate how a series of four load instructions (represented by I0, I1, I2, and I3, where I0 causes a DVC DAC debug event) results in different DAC offset values. These DAC offset values, which can be kept track of by DAC offset counter 41, represent or encode a number of instructions executed between I0 and the point in time at which a debug exception is taken for a data value breakpoint after a DVC DAC for I0 is indicated. For FIGS. 9-11, it is assumed that I0 generates a DVC1 DAC1 debug event. Therefore, DAC1 bits 66 is %10 or %11, such that DAC1 debug events are enabled for load-type data storage accesses, and DVC1 bit 70 is set to indicate that DAC1 debug events are qualified by a data value compare. The corresponding status bit for the DVC1 DAC1 debug event for I0 is DAC1R bit 90, which would not be set until each of an address value compare and a data value compare for the same access result in a match. In this example, for the data address compare, note that the DAC1 value in data address compare registers 47 may be used for comparison with the data address computed by I0, and, for the data value compare, note that the DVC1 value in data value compare registers 53 may be used for comparison with the resulting load data associated with I0. In alternate embodiments, I0 may correspond to a DAC2 DVC2, using DAC2 bits 68, DVC2 bit 72, DAC2R bit 90, etc.

Note that each of FIGS. 9-11 is described in reference to a six-stage pipeline, including the following stages: fetch, decode, effective address (EA)/E0, memory1 (mem1)/E1, memory2 (mem2)/E2, and writeback. Note that this is provided as an example pipeline for instruction pipe 22 of processor 12; however, alternate embodiments may include different pipelines having, for example, a different number of stages. Operation of an instruction pipeline, such as the 6-stage pipeline referred to in FIGS. 9-11, is known in the art and will therefore not be described in detail herein. Also, each of FIGS. 9-11 include a clock signal which may correspond to a processor clock of processor 12. The processor clock can be a system clock or a clock that is provided to only a portion of processor 12, and can be generated as known in the art.

Referring to FIG. 9, I0 enters the fetch stage in clock cycle 1, enters the decode stage in clock cycle 2, enters the EA/E0 stage in clock cycle 3 where an effective address for I0 is calculated, and then enters the mem1/E1 stage in clock cycle 4. Therefore, the effective address is ready at the end of clock cycle 3 and is provided on the address portion of conductors 35 to debug control circuitry 44 so that an address compare can be performed between the effective address of I0 and the DAC1 value stored in data address compare registers 47. (Note that the address may also be placed at this point on bus 20 by BIU 34.) This DAC1 address compare is performed in clock cycle 4, as indicated by the positive pulse in a DAC1 address compare signal which can be a control signal asserted within debug control circuitry 44 to indicate that a DAC1 address compare match is occurring for instruction I0. However, since DAC1 requires a DVC1 qualifier (due to the setting of DVC1 bit 70), a DAC1R debug event is not yet indicated, even though the address compare results in a match. Instruction processing continues because the data associated with I0 (which is to be retrieved in response to the I0 load instruction) is not yet available for a data value compare. I0 then proceeds into the mem2/E2 stage during which the data is being loaded from memory (such as, for example, memory 18 of FIG. 1). This loaded data may be available at the end of this stage (and received, for example, by BIU 34 via bus 20) and is then provided on the data portion of conductors 35 to debug control circuitry 44 so that a data value compare can be performed between the loaded data value associated with I0 and the DVC1 value stored in data value compare registers 53. Therefore, the data value compare is performed in the next clock cycle, clock cycle 6, as indicated by the positive pulse in a DVC1 data compare signal which can be a control signal asserted within debug control circuitry 44 to indicate that a DVC1 data compare match is occurring for instruction I0. Upon a match with the stored DVC1 value in data value compare registers 53, a DVC1 DAC1 debug event is indicated, thus hardware sets DAC1R bit 90.

Note that upon detection of a DVC1 DAC1 on I0 within cycle 6, DAC offset counter is cleared to 0 and enabled to start counting with each subsequent instruction completed. The pipeline cannot yet be interrupted in clock cycle 6, though, because I1 and I2 are in the memory stages (mem1 and mem2) and thus must be completed prior to further processing of pending debug exceptions, since once memory accesses are initiated they cannot be interrupted, but must be completed. Subsequent memory accesses are not initiated however, since the DVC1 DAC1 exception is now pending. Each memory access for I1 and I2 is considered completed after entering the writeback stage. Note that I2 (the later of instructions I1 and I2) is in the write back stage in clock cycle 8, after which pending debug exceptions can be taken and interrupt handling can begin. That is, interrupt handling of the DVC1 DAC1 debug event does not begin until after clock cycle 8 (for example, in clock cycle 9). Note that at the time the DVC1 DAC1 is detected, I3 is only in the EA/E0 stage of the pipeline and can thus be killed. That is, the instruction stream is interrupted at I3 (i.e. the debug exception is taken after execution of I2, prior to execution of I3). Normal execution may therefore be restarted with I3 again after interrupt processing is complete. Therefore, the DSRR0 register may store the address of I3 since this corresponds to the return pointer for the data breakpoint debug interrupt. Following completion of the debug interrupt handler software routine, normal execution is restarted by executing a return from interrupt instruction, which uses the value saved in DSRR0 as a pointer to the instruction to be returned to (I3 in this case) to continue normal (non-interrupt) instruction execution.

Note that with each subsequent instruction completed after the DAC offset counter is cleared upon detection of a DVC1 DAC1 debug event, the DAC offset counter is incremented by 1 until a debug exception is taken (at which point interrupt handling occurs). Therefore, the DAC offset counter increments to 2 in clock cycle 8, since subsequent instructions I1 and I2 complete in clock cycles 7 and 8 respectively, and therefore, DAC_OFST bits 98 of debug status register 49 is set to %10. That is, the number of instructions which executed after the instruction which caused the DVC1 DAC1 (I0, in this example) and prior to the debug event interrupt processing is 2, which is stored as the DAC_OFST. In this case, a user can know that, once a data value breakpoint occurs, it is not the previous instruction (I2, in this example) which actually caused the data value breakpoint, but it is 2 additional instructions previous to the I2 (where this value of "2" corresponds to the DAC_OFST). The instruction that is 2 additional instructions previous to I2 is I0, which did cause the data value breakpoint in the current example. As discussed above with DAC_OFST bits 98, if a DVC DAC occurs, this indicates "offset-1" of the saved DSRR0 value from the address of the instruction which took a DAC debug exception (which is I0). The offset of the saved DSRR0 value (corresponding to the address of I3 in this example) from I0 is 3, and thus DAC_OFST bits 98 indicates 2, which is "3−1". Note that in alternate embodiments, different boundaries can be used to calculate the DAC_OFST or different counting methods may be used to allow DAC_OFST to indicate I0 in this example.

Referring to FIG. 10, I0 enters the fetch stage in clock cycle 1, enters the decode stage in clock cycle 2, enters the EA/E0 stage in clock cycle 3 where an effective address for I0 is calculated, and enters the mem1/E1 stage in clock cycle 4. The effective address is provided on the address portion of conductors 35 to debug control circuitry 44 so that an address compare can be performed between the effective address of I0 and the DAC1 value stored in data address compare registers 47. This DAC1 address compare for I0 is performed in clock cycle 4, and an address compare match occurs as indicated by the positive pulse in the DAC1 address compare signal. However, since DAC1 requires a DVC1 qualifier (due to the setting of DVC1 bit 70), a DAC1R debug event is not yet indicated, even though the address compare results in a match. Instruction processing continues because the data associated with I0 (which is to be retrieved in response to the I0 load instruction) is not yet available for a data value compare. I0 then proceeds into the mem2/E2 stage during which the data is being loaded from memory (such as, for example, memory 18 of FIG. 1). However, in clock cycle 5, the load data for I0 is stalled by a memory wait state. (Note that the stall of I0 results in a pipeline stall in which each of 11-13 is also stalled in clock cycle 5.) Thus, rather than the load data for I0 being provided at then end of clock cycle 5 (as in FIG. 9), it is not provided until the end of clock cycle 6 on the data portion of conductors 35 to debug control circuitry 44. The data value compare is then performed in the next clock cycle, clock cycle 7, and a data match occurs as indicated by the positive pulse in a DVC1 data compare signal. Upon a match with the stored DVC1 value in data value compare registers 53, a DVC1 DAC1 debug event is indicated, thus hardware sets DAC1R bit 90.

Note that upon detection of a DVC1 DAC1 on I0 within cycle 7, DAC offset counter is cleared to 0 and enabled to start counting with each subsequent instruction completed. The pipeline cannot yet be interrupted in clock cycle 7, though, because I1 is in a memory stage (mem2) and thus must be completed prior to further processing of pending debug exceptions since once memory accesses are initiated, they cannot be interrupted, but must be completed. Subsequent memory accesses are not initiated however, since the DVC1 DAC1 exception is now pending. However, in the example of FIG. 10, instruction I2 returns a DSI error which indicates that access permissions were violated and thus memory will not be returning any load data for I2. Therefore, even though I2 is also in a memory stage (mem1), it can be killed due to the DSI error. I3, which is in the EA/E0 stage, can also be killed, since it has not yet begun a memory access which normally occurs in pipeline stage mem1. Instruction I1 is in the write back stage in clock cycle 8, after which pending debug exceptions can be further processed so that a debug exception can be taken and interrupt handling can begin. That is, interrupt handling of the DVC1 DAC1 debug event does not begin until after clock cycle 8 (for example, in clock cycle 9). Therefore, the instruction stream is interrupted at I2 (i.e. the debug exception is taken after execution of I1, prior to execution of I2). Normal execution may then be restarted with I2 again after interrupt processing for the debug interrupt is complete. Therefore, the DSRR0 register may store the address of I2 since this corresponds to the return pointer for the data breakpoint debug interrupt. Following completion of the debug interrupt handler software routine, normal execution is restarted by executing a return from interrupt instruction, which uses the value saved in DSRR0 as a pointer to the instruction to be returned to (I2 in this case) to continue normal (non-interrupt) instruction execution.

Note that with each subsequent instruction completed after the DAC offset counter is cleared upon detection of a DVC1 DAC1, the DAC offset counter is incremented by 1 until a debug exception is taken (at which point interrupt handling occurs). Therefore, the DAC offset counter only increments to 1 in the current example, and therefore, DAC_OFST bits 98 of debug status register 49 is set to %01. That is, the number of instructions which executed after the instruction which caused the DVC1 DAC1 (I0, in this example) and prior to the debug event interrupt processing is 1, which is stored as the DAC_OFST. In this case, a user can know that, once a data value breakpoint occurs, it is not the previous instruction (I1, in this example) which actually caused the data value breakpoint, but it is 1 additional instruction previous to I2. The instruction that is 1 additional instruction previous to I1 is I0, which did cause the data value breakpoint in the current example. As discussed above with DAC_OFST bits 98, if a DVC DAC occurs, this indicates "offset-1" of the saved DSRR0 value from the address of the instruction which took a DAC debug exception (which is I0). The offset of the saved DSRR0 value (corresponding to the address of I2 in this example) from I0 is 2, and thus DAC_OFST bits 98 indicates 1, which is "2-1". Note that in alternate embodiments, different boundaries can be used to calculate the DAC_OFST or different counting methods may be used to allow DAC_OFST to indicate I0 in this example.

Referring to FIG. 11, I0 enters the fetch stage in clock cycle 1, enters the decode stage in clock cycle 2, enters the EA/E0 stage in clock cycle 3 where an effective address for I0 is calculated, and enters the mem1/E1 stage in clock cycle 4. The effective address is provided on the address portion of conductors 35 to debug control circuitry 44 so that an address compare can be performed between the effective address of I0 and the DAC1 value stored in data address compare registers 47. This DAC1 address compare is performed in clock cycle 4 for I0 and an address match occurs, as indicated by the positive pulse in a DAC1 address compare signal. However, since DAC1 requires a DVC1 qualifier (due to the setting of DVC1 bit 70), a DAC1R debug event is not yet indicated, even though the address compare results in a match. Instruction processing continues because the data associated with I0 (which is to be retrieved in response to the I0 load instruction) is not yet available for a data value compare. I0 then proceeds into the mem2/E2 stage during which the data is being loaded from memory (such as, for example, memory 18 of FIG. 1). The load data for I0 is ready at then end of clock cycle 5, and is provided on the data portion of conductors 35 to debug control circuitry 44. The data value compare for I0 is then performed in the next clock cycle, clock cycle 6, and a data match occurs as indicated by the positive pulse in a DVC1 data compare signal. Upon a match with the stored DVC1 value in data value compare registers 53, a DVC1 DAC1 debug event is indicated, thus hardware sets DAC1R bit 90.

Upon detection of a DVC1 DAC1 on I0 within cycle 6, DAC offset counter is cleared to 0 and enabled to start counting with each subsequent instruction completed. In the example of FIG. 11, note that I1, in the memory stage mem1, caused an error due to an address translation miss in the translation look-aside buffer (TLB), and thus I1 does not continue executing. (Note that a TLB is not illustrated in the drawings, but could be located, along with a memory management unit (MMU), in processor 12, as known in the art, where both the TLB and MMU may operate as known in the art). Therefore, in clock cycle 6, all of instructions I1-I3 can be killed. Therefore, debug exceptions can be immediately enabled for clock cycle 7, so that a debug exception can be taken and interrupt handling can begin. That is, interrupt handling of the DVC1 DAC1 debug event for instruction I0 can begin after clock cycle 6 (for example, in clock cycle 7). Therefore, the instruction stream is interrupted at I1 (i.e. the debug exception is taken after execution of I0, prior to execution of I1). Execution may then begin with I1 again after interrupt processing is complete. Therefore, the DSRR0 register may store the address of I1 since this corresponds to the return pointer for the data breakpoint debug interrupt. In the current example, the DAC offset counter remains at 0; therefore, DAC_OFST bits 98 of debug status register 49 remain %00. That is, the instruction which caused the DVC1 DAC1 (I0, in this example) is the instruction previous to instruction which was interrupted (I1). Normal execution may then be restarted with I1 again after interrupt processing for the debug interrupt is complete. Therefore, the DSRR0 register may store the address of I1 since this corresponds to the return pointer for the data breakpoint debug interrupt. Following completion of the debug interrupt handler software routine, normal execution is restarted by executing a return from interrupt instruction, which uses the value saved in DSRR0 as a pointer to the instruction to be returned to (I1 in this case) to continue normal (non-interrupt handling) instruction execution.

Therefore, note that the timing of a data value breakpoint with respect to a DVC DAC can vary depending on various factors, many of which are unpredictable and not known before hand. Through the use of a DAC_OFST, though, once the debug exception is actually taken, a user can determine which instruction actually caused the data value breakpoint (i.e. actually caused a debug exception to be taken).

In some circumstances, such as when the user has disabled debug interrupts by explicitly masking them with an interrupt mask control, IDE bit 76 notifies the user that a debug event (such as a DVC DAC debug event) has occurred, but that it is imprecise because debug exceptions have been globally disabled by the user. That is, even though a debug event has occurred, debug exceptions are currently masked by the user. Therefore, once the debug exception is actually taken after debug interrupts have been unmasked, the DAC_OFST value cannot be used to precisely determine which instruction caused the debug exception to occur, since many instructions may be executed prior to the user unmasking the debug interrupts again. IDE bit 76 may used by software to qualify the validity of DAC_OFST in this case, since it will not reflect the actual number of instructions executed.

FIGS. 12-16 illustrate, in tabular form, various examples illustrating occurrence of DAC and DVC DAC debug events and in one embodiment, the resultant updates of debug status register 49, such as for DAC_OFST bits 98. In the table of FIGS. 12-16, a series of three instructions, I0, I1, and I2, are used for each of the examples. The first instruction, I0, is a load/store class instruction, the second instruction, I1, is a load/store class instruction unless otherwise specified, and the third instruction, I2, is a load/store instruction unless otherwise specified. Note that FIG. 12 includes rows 201-208, FIG. 13 includes rows 209-212, FIG. 14 includes rows 213-215, FIG. 15 includes rows 216-218, and FIG. 16 includes rows 219-220.

Referring to row 201 of the table representing an example, it is assumed that I0 results in a DTLB error and no DAC debug event. In this case, a DTLB exception is taken and no update to the debug status registers is performed. Row 202 represents an example in which I0 results in a data storage interrupt (DSI) error and no DAC debug event. In this case, a DSI exception is taken and no update to the debug status registers is performed. Row 203 represents an example in which I0 results in a DTLB error; however, a DACx debug event is indicated (e.g. a DAC1 or DAC2 debug event). In this case, the debug exception caused as a result of the DACx debug event is taken, and the corresponding DACx bit field is set (e.g. DAC1R, DAC1W, DAC2R, DAC2W) and IDE bit 76 is set, and DAC_OFST bits 98 is set to %00. The DSRR0 register points to I0 (i.e. stores the address of I0). Row 204 represents an example in which I0 results in a DSI error; however, a DACx debug event is indicated (e.g. a DAC1 or DAC2 debug event). In this case, the debug exception caused as a result of the DACx debug event is taken, and the corresponding DACx bit field is set (e.g. DAC1R, DAC1W, DAC2R, DAC2W) and IDE bit 76 is set, and DAC_OFST bits 98 is set to %00. The DSRR0 register points to I0 (i.e. stores the address of I0). Row 205 represents an example in which I0 causes a DACx debug event (e.g. a DAC1 or DAC2 debug event). In this case, the debug exception caused as a result of the DACx debug event is taken, and the corresponding DACx bit field is set (e.g. DAC1R, DAC1W, DAC2R, DAC2W), and DAC_OFST bits 98 is set to %00. The DSRR0 register points to I1 (i.e. stores the address of I1). Note that for the conditions indicated in Rows 203 and 204, IDE bit 76 is set, however for Row 205, IDE bit 76 is not set. This is used to indicate that the DAC_OFST setting of %00 for Rows 203 and 204 is indicating that instruction I0 caused the interrupt to occur, and that the saved program counter value in DSRR0 is pointing to I0 and not to the normal position (I1) when a debug interrupt is taken on I0 due to a DAC1 or DAC2 event. This occurs because there is also a simultaneous DTLB or DSI exception on I0, and thus I0 should be re-executed following the debug interrupt, since it has not completed execution. On re-execution, the DAC1, DAC2 events may be disabled by the user, and the normal DTLB or DSI exception is then taken and handled as appropriate. For Row 205 however, instruction I0 has completed execution, thus the saved DSRR0 value points to I1, with a DAC_OFST value of %00, and IDE is cleared, indicating the normal boundary condition in DSRR0 for a DAC_OFST value of %00.

Rows 206-220 represent various examples in which I0 causes a DVCx DACx debug event (e.g. either a DVC1 DAC1 or DVC2 DAC2 debug event). Row 206 represents an example in which I1 causes no exceptions and can be any instruction and I3 causes no exceptions and is not a load/store type of instruction. In this case, the debug exception caused as a result of the DVCx DACx debug event is taken, and the corresponding DACx bit field is set (e.g. DAC1R, DAC1W, DAC2R, DAC2W), and DAC_OFST bits 98 is set to %01. The DSRR0 register points to the instruction after I2. By examining DAC_OFST bits 98 it can be determined that I0 caused the DVCx DACx event.

Row 207 represents an example similar to that of FIG. 9 in which I1 causes no exceptions and I3 causes no exceptions, but I3 is a load/store class instruction. In this case, the debug exception caused as a result of the DVCx DACx debug event is taken, and the corresponding DACx bit field is set (e.g. DAC1R, DAC1W, DAC2R, DAC2W), and DAC_OFST bits 98 is set to %10. The DSRR0 register points to the instruction after I2. In this example, instruction I2 should be allowed to complete, since it had begun a memory access. Row 208 represents an example similar to that of FIG. 11 in which I1 causes a DTLB error and no DAC. In this case, the debug exception caused as a result of the DVCx DACx debug event is taken, and the corresponding DACx bit field is set (e.g. DAC1R, DAC1W, DAC2R, DAC2W), and DAC_OFST bits 98 is set to %00. The DSRR0 register points to I1, since it incurred a DTLB error, and did not complete execution. By examining DAC_OFST bits 98 it can be determined that I0 caused the DVCx DACx event.

Row 209 represents an example in which I1 causes a DSI error and no DAC. In this case, the debug exception caused as a result of the DVCx DACx debug event is taken, and the corresponding DACx bit field is set (e.g. DAC1R, DAC1W, DAC2R, DAC2W), and DAC_OFST bits 98 is set to %00. The DSRR0 register points to I1, since it incurred a DSI exception and did not complete. Row 210 represents an example in which I1 causes a DTLB error and a DACy (e.g. a DAC1 or DAC2 debug event). In this case, the debug exception caused as a result of the DVCx DACx debug event is taken, and the corresponding DACx bit field is set (e.g. DAC1R, DAC1W, DAC2R, DAC2W), and DAC_OFST bits 98 is set to %00. The DSRR0 register points to I1. In this case, the DACy event for I1 is not reported, since it should be re-executed anyway due to the DTLB error on I1. Row 211 represents an example in which I1 causes a DSI error and a DACy (e.g. a DAC1 or DAC2 debug event). In this case, the debug exception caused as a result of the DVCx DACx debug event is taken, and the corresponding DACx bit field is set (e.g. DAC1R, DAC1W, DAC2R, DAC2W), and DAC_OFST bits 98 is set to %00. The DSRR0 register points to I1. In this case, the DACy event for I1 is not reported, since it should be re-executed anyway due to the DTLB error on I1. Note that for the examples of rows 208-211, the I1 exception is masked; however, this is implementation dependent and may differ on other processors.

Row 212 represents an example in which I1 causes a DACy (e.g. a DAC1 or DAC2 debug event). In this case, the debug exception is taken, the corresponding DACx bit field is set (e.g. DAC1R, DAC1W, DAC2R, DAC2W), the corresponding DACy bit field is set (e.g. DAC1R, DAC1W, DAC2R, DAC2W), and DAC_OFST bits 98 is set to %01. The DSRR0 register points to I2. Row 213 represents an example in which I1 causes a DVCy DACy (e.g. a DVC1 DAC1 or DVC2 DAC2 debug event) and is a normal load/store instruction and in which I2 is not a load/store instruction. In this case, the debug exception is taken, and the corresponding DACx bit field is set (e.g. DAC1R, DAC1W, DAC2R, DAC2W), the corresponding DACy bit field is set (e.g. DAC1R, DAC1W, DAC2R, DAC2W), and DAC_OFST bits 98 is set to %01. The DSRR0 register points to I2. Note also that in this case, if x equals y, then the resultant state of the debug status registers and DSRR0 may be indistinguishable from the "no DACy" case (i.e. the case in which I2 does not cause a DACy).

Row 214 represents an example in which I1 causes a DVCy DACy (e.g. a DVC1 DAC1 or DVC2 DAC2 debug event) and is a normal load/store instruction and in which I2 is a load/store instruction which does not cause an exception. In this case, the debug exception is taken after I2 completes, since it had begun a memory access, and the corresponding DACx bit field is set (e.g. DAC1R, DAC1W, DAC2R, DAC2W), the corresponding DACy bit field is set (e.g. DAC1R, DAC1W, DAC2R, DAC2W), and DAC_OFST bits 98 is set to %10. The DSRR0 register points to the instruction after I2. Note also that in this case, if x equals y, then the resultant state of the debug status registers and DSRR0 may be indistinguishable from the "no DACy" case (i.e. the case in which I2 does not cause a DACy).

Row 215 represents an example in which I1 causes a DVCy DACy (e.g. a DVC1 DAC1 or DVC2 DAC2 debug event) and is a normal load/store instruction and in which I2 causes a DSI error. Row 216 represents an example in which I1 causes a DVCy DACy (e.g. a DVC1 DAC1 or DVC2 DAC2 debug event) and is a normal load/store instruction and in which I2 causes a DTLB error. In either of these cases, the debug exception is taken, and the corresponding DACx bit field is set (e.g. DAC1R, DAC1W, DAC2R, DAC2W), the corresponding DACy bit field is set (e.g. DAC1R, DAC1W, DAC2R, DAC2W), and DAC_OFST bits 98 is set to %01. The DSRR0 register points to I2. Note also that in this case, if x equals y, then the resultant state of the debug status registers and DSRR0 may be indistinguishable from the "no DACy" case (i.e. the case in which I2 does not cause a DACy). Also, note that in these cases, instruction I2 is masked; however, this behavior is implementation dependent and may differ on other processors.

Row 217 represents an example in which I1 causes a DVCy DACy (e.g. a DVC1 DAC1 or DVC2 DAC2 debug event) and is a normal load/store instruction and in which I2 is a normal load/store instruction or a multiple word load/store instruction which causes a DACy or a DVCy DACy. In this case, the debug exception is taken, and the corresponding DACx bit field is set (e.g. DAC1R, DAC1W, DAC2R, DAC2W), the corresponding DACy bit field is set (e.g. DAC1R, DAC1W, DAC2R, DAC2W), and DAC_OFST bits 98 is set to %10. The DSRR0 register points to the instruction after I2. Note also that in this case, if x equals y, then the resultant state of the debug status registers and DSRR0 may be indistinguishable from the "no DACy" case (i.e. the case in which I1 or I2 does not cause a DACy).

Row 218 represents an example in which I1 causes a DVCy DACy (e.g. a DVC1 DAC1 or DVC2 DAC2 debug event) and is a multiple word load/store instruction and in which I2 is any instruction. In this case, the debug exception is taken, and the corresponding DACx bit field is set (e.g. DAC1R, DAC1W, DAC2R, DAC2W), the corresponding DACy bit field is set (e.g. DAC1R, DAC1W, DAC2R, DAC2W), and DAC_OFST bits 98 is set to %01. The DSRR0 register points to I2. In this case, since I1 loads or stores multiple registers, there is sufficient time to prevent I2 from accessing memory, once the DVCx DACx condition occurs for I0, thus it may be killed. Note also that in this case, if x equals y, then the resultant state of the debug status registers and DSRR0 may be indistinguishable from the "no DACy" case (i.e. the case in which I2 does not cause a DACy).

Row 219 represents an example in which I1 is any instruction and does not cause an exception and in which I2 is a normal load/store or multiple word load/store instruction which causes a DSI error and which may or may not cause a DAC. In this case, the debug exception is taken, and the corresponding DACx bit field is set (e.g. DAC1R, DAC1W, DAC2R, DAC2W), the corresponding DACy bit field is set (e.g. DAC1R, DAC1W, DAC2R, DAC2W), and DAC_OFST bits 98 is set to %01. The DSRR0 register points to I2. Also, note that in this case, instruction I2 is masked; however, this behavior is implementation dependent and may differ on other processors.

Row 220 represents an example in which I1 is any instruction and does not cause an exception and in which I2 is a normal load/store or multiple word load/store instruction which causes a DACy or a DVCy DACy. In this case, the debug exception is taken, and the corresponding DACx bit field is set (e.g. DAC1R, DAC1W, DAC2R, DAC2W), the corresponding DACy bit field is set (e.g. DAC1R, DAC1W, DAC2R, DAC2W), and DAC_OFST bits 98 is set to %10. The DSRR0 register points to the instruction after I2. Note also that in this case, if x equals y, then the resultant state of the debug status registers and DSRR0 may be indistinguishable from the "no DACy" case (i.e. the case in which I2 does not cause a DACy).

FIG. 17 is a diagram of a debug status register 49 associated with the data processing system of FIG. 1 in accordance with another embodiment of the present invention. In the example of FIG. 17, debug status register 49 includes bit fields labeled as: IDE 76, ICMP 78, BRT 80, IAC1 82, IAC2 84, IAC3 86, IAC4 88, DAC1R 90, DAC1W 92, DAC2R 94, DAC2W 96, DAC_OFSTA 102, OCCA 104, DAC_OFSTB 106, and OCCB 108. The example of FIG. 17 may also include reserved bit fields 110 which may be reserved for future use. Note that the descriptions provided above (such as, for example, in the discussions of FIGS. 7 and 8) with respect to debug status register 49 and bit fields IDE 76, ICMP 78, BRT 80, IAC1 82, IAC2 84, IAC3 86, IAC4 88, DAC1R 90, DAC1W 92, DAC2R 94, and DAC2W 96 also apply to FIG. 17, and therefore will not be repeated here. Unlike the example of FIG. 7, though, the example of FIG. 17 includes multiple DAC offset fields (e.g. DAC_OFSTA 102 and DAC_OFSTB 106) rather than the DAC_OFST 98. The use of multiple DAC offset fields allows for the ability to keep track of multiple offsets, where each DAC offset field may operate as described above in reference to DAC_OFST 98. However, due to the existence of multiple DAC offset fields, each DAC offset field (e.g. DAC_OFSTA 102 and DAC_OFSTB 106) has a corresponding occurred field (e.g. OCCA 104 and OCCB 108, respectively).

DAC_OFSTA bits 102 may therefore be used to indicate a number of instructions that have executed between an instruction which caused a first DVC DAC to be indicated (either a DVC1 DAC1 or a DVC2 DAC2) and the point at which a data value breakpoint occurs and a debug exception is taken for a DVC DAC. DAC_OFSTA bits 102 may be used to store the "offset-1" of the saved DSRR0 value from the address of the load or store instruction which took a first data address compare debug exception in the same manner as DAC_OFST 98. As discussed above, the DSRR0 corresponds to debug save restore register 0, and the saved DSRR0 value corresponds to the return pointer for a debug interrupt. In this manner, it can be determined how many instructions have executed within the interval between the address which caused a first DVC DAC and the point at which the instruction stream is interrupted to take a data value breakpoint (where that data value breakpoint may be taken as a result of the first DVC DAC or of another DVC DAC. This allows a user to determine which instruction caused the first DVC DAC. In one embodiment, DAC_OFSTA bits 102 is normally set to %00, and a DVC DAC will set this field to %00, %01, %10, or %11, which represents the "offset-1". Since DAC_OFSTA bits 102 is normally set to %00 by default, OCCA 104 may be set upon the occurrence of a first DVC DAC, to indicate that DAC_OFSTA is holding a value indicative of a DVC DAC offset. DAC_OFSTB bits 106 may therefore be used to indicate a number of instructions that have executed between an instruction which caused a second DVC DAC to be indicated and the point at which a data value breakpoint occurs and a debug exception is taken for a DVC DAC. DAC_OFSTB bits 106 may be used to store the "offset-1" of the saved DSRR0 value from the address of the load or store instruction which took a second data address compare debug exception. In this manner, it can also be determined how many instructions have executed within the interval between the address which cause a second DVC DAC and the point at which the instruction stream is interrupted to take a data value breakpoint (where again, the data value breakpoint may be taken as a result of the first DVC DAC or the second DVC DAC.) In one embodiment, DAC_OFSTB bits 106 is normally set to %00, and a DVC DAC will set this field to %00, %01, %10, or %11, which represents the "offset-1". Since DAC_OFSTB bits 106 is normally set to %00 by default, OCCB 108 may be set upon the occurrence of a second DVC DAC. (Also, as described above, note that if a simultaneous DTLB error or DSI error occurs for a DVC DAC, the corresponding DAC offset bits may be set to %00 and IDE bit 76 may be set to 1, as discussed above in reference to DAC_OFST bits 98.)

Therefore, note that a number of instructions may result in DVC DACs, and at the point an instruction stream is interrupted to take a data value breakpoint, each of the offset fields DAC_OFSTA 102 and DAC_OFSTB 104, assuming that the corresponding occurrence bit is set, can indicate which instruction(s) in the instruction stream caused a DVC DAC which may have resulted in the data value breakpoint. If both OCCA bit 104 and OCCB bit 108 are set, indicating that two DVC DACs occurred, a user may use the corresponding offset value to indicate which instruction actually caused each DVC DAC, but it may be necessary for the user to actually determine which of these two instructions (i.e. which of the two DVC DACs) actually resulted in the data value breakpoint which interrupted the instruction stream.

FIG. 18 represents a timing diagram illustrating use of multiple offset fields, as discussed in reference to FIG. 17. For the example of FIG. 18, it is assumed that that each of I0-I4 are load instructions, and that I0 generates a first DAC DVC debug event (DVCx DACx, where x can be either 1 or 2) and I2 generates a second DAC DVC debug event (DVCy DACy, where y can be either 1 or 2). FIG. 18 is also described in reference to a six-stage pipeline; however, alternate embodiments may include different pipelines having, for example, a different number of stages. Operation of an instruction pipeline, such as the 6-stage pipeline referred to in FIG. 18, is known in the art and therefore will not be described in detail herein. Also, FIG. 18 includes a clock signal which may correspond to a processor clock of processor 12. The processor clock can be a system clock or a clock that is provided to only a portion of processor 12, and can be generated as known in the art.

Referring to FIG. 18, I0 enters the fetch stage in clock cycle 1, enters the decode stage in clock cycle 2, enters the EA/E0 stage in clock cycle 3 where an effective address for I0 is calculated, and then enters the mem1/E1 stage in clock cycle 4. Therefore, the effective address is ready at the end of clock cycle 3 and is provided on the address portion of conductors 35 to debug control circuitry 44 so that an address compare can be performed between the effective address of I0 and the DAC values (DAC1 and DAC2) stored in data address compare registers 47. (Note that the address may also be placed at this point on bus 20 by BIU 34.) This DACx address compare is performed for instruction I0 in clock cycle 4, and a match occurs, as indicated by the positive pulse in a DAC address compare signal which can be a control signal asserted within debug control circuitry 44 to indicate that a DACx address compare is being performed and a match has occurred. However, since DACx requires a DVCx qualifier (due to the setting of a DVCx bit, e.g. DVC1 bit 70 or DVC2 bit 72), a debug event is not yet indicated, even though the DACx address compare results in a match. Instruction processing continues because the data associated with I0 (which is to be retrieved in response to the I0 load instruction) is not yet available for a data value compare. I0 then proceeds into the mem2/E2 stage during which the data is being loaded from memory (such as, for example, memory 18 of FIG. 1). This loaded data may be available at the end of this stage (and received, for example, but BIU 34 via bus 20) and is then provided on the data portion of conductors 35 to debug control circuitry 44 so that a data value compare can be performed between the loaded data value associated with I0 and the DVCx value stored in data value compare registers 53. Therefore, the data value compare is performed in the next clock cycle, clock cycle 6, and a match occurs, as indicated by the positive pulse in a DVCx data compare signal which can be a control signal asserted within debug control circuitry 44 to indicate that a DVC data compare is occurring. Upon a match with the stored DVCx value in data value compare registers 53, a DVCx DACx debug event is indicated, thus hardware sets the corresponding status bits (e.g. DAC1R bit 90 or DAC2R bit 94, depending on whether I0 caused a DAC1 DVC1 or a DAC2 DVC2.

Note that upon detection of a DVCx DACx on I0 within cycle 6, DAC offset A counter is cleared to 0 and enabled to start counting with each subsequently completed instruction. (DAC offset A counter may be included in counters 41.) The pipeline cannot yet be interrupted in clock cycle 6, though, because I1 and I2 are in the memory stages (mem1 and mem2) and thus must be completed prior to further processing of pending debug exceptions since once memory accesses are initiated, they cannot be interrupted, but must be completed. Subsequent memory accesses are not initiated however, since the DVCx DACx exception is now pending. Each memory access for I1 and I2 is considered completed after entering the writeback stage. Note that I2 (the later of instructions I1 and I2) is in the write back stage in clock cycle 8, after which pending debug exceptions can be processed so that a debug exception can be taken and interrupt handling can begin. That is, interrupt handling of the DVC1 DAC1 debug event cannot begin until after clock cycle 8 (for example, clock cycle 9). Note that at the time the DVCx DACx is detected, I3 is only in the EA/E0 stage of the pipeline and can thus be killed. That is, the instruction stream is interrupted at I3. Execution may therefore begin with I3 again after interrupt processing is complete. Therefore, the DSRR0 register may stored the address of I3 since this corresponds to the return pointer for the data breakpoint debug interrupt. Following completion of the debug interrupt handler software routine, normal execution is restarted by executing a return from interrupt instruction, which uses the value saved in DSRR0 as a pointer to the instruction to be returned to (I3 in this case) to continue normal (non-interrupt) instruction execution.

Note that with each subsequent instruction completed after the DAC offset A counter is cleared upon detection of a DVCx DACx debug event, the DAC offset A counter is incremented by 1 until a debug exception is taken (at which point interrupt handling occurs). Therefore, the DAC offset A counter increments to 2 in clock cycle 8, and therefore, DAC_OFSTA bits 102 of debug status register 49 is set to %10 and OCCA bit 104 is also set. That is, the number of instructions which executed after the instruction which caused the DVCx DACx (I0, in this example) and prior to the interrupt processing is 2, which is stored as the DAC_OFSTA.

Note that I2 enters the EA/E0 stage in clock cycle 5. Therefore, the effective address is ready at the end of clock cycle 5 and is provided on the address portion of conductors 35 to debug control circuitry 44 so that an address compare can be performed between the effective address of I2 and the DAC values (DAC1 and DAC2) stored in data address compare registers 47. (Note that the address may also be placed at this point on bus 20 by BIU 34.) This DACy address compare is performed in clock cycle 6, and a match occurs, as indicated by the positive pulse in a DACy address compare signal which can be a control signal asserted within debug control circuitry 44 to indicate that a DAC address compare is being performed, and a match is occurring. However, since DACy requires a DVCy qualifier (due to the setting of a DVCy bit, e.g. DVC1 bit 70 or DVC2 bit 72), a debug event is not yet indicated, even though the DACy address compare results in a match. Instruction processing continues because the data associated with I2 (which is to be retrieved in response to the I2 load instruction) is not yet available for a data value compare. I2 then proceeds into the mem2/E2 stage during which the data is being loaded from memory (such as, for example, memory 18 of FIG. 1). This loaded data may be available at the end of this stage (and received, for example, but BIU 34 via bus 20) and is then provided on the data portion of conductors 35 to debug control circuitry 44 so that a data value compare can be performed between the loaded data value associated with I2 and the DVCy value stored in data value compare registers 53. Therefore, the data value compare is performed in the next clock cycle, clock cycle 8, and a match occurs as indicated by the positive pulse in a DVCy data compare signal which can be a control signal asserted within debug control circuitry 44 to indicate that a DVC data compare is being performed and a match is occurring. Upon a match with the stored DVCy value in data value compare registers 53, a DVCy DACy debug event is indicated, thus hardware sets the corresponding status bits (e.g. DAC1R bit 90 or DAC2R bit 94, depending on whether I2 caused a DAC1 DVC1 or a DAC2 DVC2).

Note that upon detection of a DVCy DACy on I2 within cycle 8, DAC offset B counter is cleared to 0 and enabled to start counting with each subsequent instruction completed. (DAC offset B counter may be included in counters 41.) The pipeline, in clock cycle 8, has not yet been interrupted since both I1 and I2 must complete prior to a data value breakpoint being taken in response to the DVCx DACx caused by I0. Therefore, the data corresponding to I2 is also returned, allowing for a DVCy DACy to occur prior to taking a debug exception. As described above, the instruction stream is interrupted at I3 after cycle 8, meaning that the DAC offset B counter is not incremented and remains at zero upon taking the debug exception. Therefore, DAC_OFSTB bits 106 of debug status register 49 is set to %00 and OCCB bit 108 is also set (this will allow a user to know that a %00 indicates an actual offset value and not just a default value returned when no second DVC DAC has occurred). Therefore, the number of instructions which executed after the instruction which caused the DVCy DACy (I2, in this example) and prior to the interrupt processing is 0. In this manner, note that DAC_OFSTB bits 106 and OCCB bit 108 can provide information on a debug event (e.g. DVCy DACy) which occurs between a first debug event (e.g. DVCx DACx) and a point at which the debug exception for that first debug event is taken.

Therefore, note that in the example of FIG. 18, two DVC DACs occur, each caused by a different instruction, prior to taking a debug exception after cycle 8. Using DAC_OFSTA bits 102 and DAC_OFSTB bits 104, along with the corresponding OCCA bit 104 and OCCB bit 108 it is known that each of I0 (2 additional instructions prior to previous instruction I2, corresponding to the point which the instruction stream is interrupted) and I2 (0 additional instruction prior to previous instruction I2, corresponding to the point at which the instruction stream is interrupted) caused a DVC DAC. A user can then decipher which one actually resulted in the data value breakpoint (which, in this example, was I0, which caused the first DVC DAC, DVCx DACx). Note also, that x and y may be different such that I0 causes a DVC1 DAC1 or a DVC2 DAC2 and I2 causes the other of DVC1 DAC1 and DVC2 DAC2. Alternatively, x may equal y, such that both I0 and I2 cause either a DVC1 DAC1 or a DVC2 DAC2. Also, note that in one embodiment, DAC A offset counter and DAC B offset counter may be located within offset counter(s) 41.

Therefore, it can be appreciated how one or more offset values may be used to help determine a number of instructions which execute between a debug event occurring and a debug exception being taken (i.e. between a debug event occurring and interrupt handling for the debug event commencing). This may allow for improved debugging in which a user can use these one or more offset values to better understand which instruction actually caused a debug exception to be taken. Although the above descriptions have been provided with respect to DVC DAC debug events which result in data value breakpoints, these offset values (such as DAC_OFST, DAC_OFSTA, and DAC_OFSTB) may be used for other types of debug events. That is, offset fields such as DAC_OFST, DAC_OFSTA, and DAC_OFSTB may be used to indicate the number of instructions which execute between any type of debug event occurring and a corresponding debug exception being taken (i.e. between any type debug event occurring and interrupt handling for the particular debug event commencing).

Also, note that knowing the number of instructions which have executed since a debug event has occurred, rather than the location of the instruction which has caused the event may be helpful, since it can be understood that the same instruction (with the same location) may be executed multiple times before a pipeline boundary is reached at which the instruction stream may be interrupted for a pending debug event, thus location information may be insufficient on its own to determine the actual sequence of events.

In one embodiment, a system includes a pipelined processor for executing a plurality of instructions by sequentially fetching, decoding, executing and writing results associated with execution of each instruction, and debug circuitry coupled to the pipelined processor for monitoring execution of the instructions to determine when a debug event occurs and generating a debug exception to interrupt instruction processing flow, the debug circuitry further including control circuitry for indicating a value representative of a number of instructions, if any, that complete instruction execution between an instruction that caused the debug event and a point in instruction execution when the debug exception is taken.

In a further embodiment, the control circuitry of the debug circuitry further includes a counter for counting and providing a count value as the value representative of the number of instructions that complete instruction execution following the instruction that caused the debug event. In yet a further embodiment, the count value is greater than zero indicating that processing of the debug event is imprecise.

In another further embodiment, the debug circuitry indicates that one or more additional instructions that complete instruction execution following an instruction that caused the debug event also caused a debug event to occur.

In another further embodiment, the pipelined processor executes at least two instructions that each cause a debug event and the control circuitry further includes a plurality of counters, each counter providing a respective count value determined by a number of additional instructions that complete instruction execution following a respective one of the at least two instructions that cause the debug event.

In another further embodiment, the debug circuitry further includes a debug status register having a field for holding the value representative of the number of additional instructions, if any, that complete instruction execution following the instruction that caused the debug event until the predetermined point in instruction execution when the debug exception is taken.

In another further embodiment, the debug circuitry determines that a debug event has occurred in response to decoding one of the plurality of instructions, comparing an address formed by the pipelined processor with one or more predetermined debug addresses to determine if a data address match has occurred, and comparing a data value accessed by the pipelined processor with one or more predetermined data values to determine if a data value match has occurred, the debug event requiring a match of both comparing operations to occur.

In another embodiment, a system includes pipelined processing circuitry for executing a plurality of instructions by sequentially fetching, decoding, executing and writing results associated with execution of each instruction, and debug circuitry coupled to the pipelined processing circuitry for monitoring execution of the instructions by selectively comparing one or more debug addresses with an address formed by instruction execution and selectively comparing at least one debug data value with data formed by instruction execution, the debug circuitry determining when both comparisons result in a match and, in response, indicating a debug event, the debug circuitry indicating a number of instructions executed after an instruction that caused the debug event until the predetermined point in instruction execution when a data value breakpoint is taken.

In a further embodiment of the another embodiment, the data value breakpoint is imprecise and the test circuitry further includes a register having a bit field that indicates whether an imprecise data value breakpoint has occurred.

In another further embodiment of the another embodiment, the test circuitry further comprises a status register for indicating status information regarding events occurring between when the debug event occurs and when the data value breakpoint is taken. In yet a further embodiment, one of the events occurring between when the debug event occurs and when the data value breakpoint is taken further includes a second debug event.

In another further embodiment of the another embodiment, the debug circuitry further includes a counter for counting and providing a count value of the number of instructions that complete instruction execution following the instruction that caused the debug event.

In another further embodiment of the another embodiment, the debug circuitry further includes a status debug register having a field for holding a value for indicating the number of additional instructions, if any, that complete instruction execution following the instruction that caused the debug event until the predetermined point in instruction execution when the data value breakpoint is taken.

In yet another embodiment, a method includes executing a plurality of instructions by sequentially fetching, decoding, executing and writing results associated with execution of each instruction, monitoring execution of the instructions to determine when a debug event occurs, generating a debug exception to interrupt instruction processing flow, and indicating a number of instructions, if any, that complete instruction execution between an instruction that caused the debug event and a point in instruction execution when the debug exception is taken.

In a further embodiment of the yet another embodiment, the method further includes counting and providing a count value of the number of instructions that complete instruction execution following the instruction that caused the debug event. In a further embodiment, the method further includes forming a count value that is greater than zero indicating that processing of the debug event is imprecise.

In another further embodiment of the yet another embodiment, the method further includes determining that one or more additional instructions that complete instruction execution following an instruction that caused the debug event also caused a debug event to occur.

In another further embodiment of the yet another embodiment, the method further includes determining that at least two instructions each cause a debug event, and storing in differing counters a respective count value of a number of additional instructions that complete instruction execution following each of the at least two instructions.

In another further embodiment of the yet another embodiment, the method further includes providing a debug status register in the debug circuitry, the status register having a field for holding a value for indicating the number of additional instructions, if any, that complete instruction execution following the instruction that caused the debug event until the predetermined point in instruction execution when the debug exception is taken.

In another further embodiment of the yet another embodiment, the method further includes determining that a debug event has occurred in response to decoding one of the plurality of instructions, comparing an address formed by the pipelined processor with one or more predetermined debug addresses to determine if a data address match has occurred, comparing a data value form by the pipelined processor with one or more predetermined data values to determine if a data value match has occurred, the debug event requiring a match of both comparing operations to occur.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 18 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system comprising: a pipelined processor for executing a plurality of instructions by sequentially fetching, decoding, executing and writing results associated with execution of each instruction; and debug circuitry coupled to the pipelined processor for monitoring execution of the instructions to determine when a debug event occurs and generating a debug exception to interrupt instruction processing flow, the debug circuitry further comprising control circuitry for indicating a count of a number of instructions that complete instruction execution by entering a writeback stage of the pipelined processor between an instruction that caused the debug event and a point in instruction execution when the debug exception in response to the debug event is taken, wherein the debug circuitry determines that a debug event has occurred in response to decoding one of the plurality of instructions, comparing an address formed by the pipelined processor with one or more predetermined debug addresses to determine if a data address match has occurred, and comparing a data value accessed by the pipelined processor with one or more predetermined data values to determine if a data value match has occurred, the debug event requiring a match of both comparing operations to occur.

2. The system of claim 1 wherein the control circuitry of the debug circuitry further comprises:

a counter for counting and providing a count value as the count of the number of instructions that complete instruction execution following the instruction that caused the debug event.

3. The system of claim 2 wherein the count value is greater than zero indicating that processing of the debug event is imprecise.

4. The system of claim 1 wherein the debug circuitry indicates that one or more additional instructions that complete instruction execution following an instruction that caused the debug event also caused a debug event to occur.

5. The system of claim 1 wherein the pipelined processor executes at least two instructions that each cause a debug event and the control circuitry further comprises a plurality of counters, each counter providing a respective count value determined by a number of additional instructions that complete instruction execution following a respective one of the at least two instructions that cause the debug event.

6. The system of claim 1 wherein the debug circuitry further comprises:

a debug status register having a field for holding the count of the number of instructions that complete instruction execution by entering a writeback stage of the pipelined processor between the instruction that caused the debug event and the point in instruction execution when the debug exception in response to the debug event is taken.

7. A system comprising:

pipelined processing circuitry for executing a plurality of instructions by sequentially fetching, decoding, executing and writing results associated with execution of each instruction; and debug circuitry coupled to the pipelined processing circuitry for monitoring execution of the instructions by selectively comparing one or more debug addresses with an address formed by instruction execution and selectively comparing at least one debug data value with data formed by instruction execution, the debug circuitry determining when both comparisons result in a match and, in response, indicating a debug event, the debug circuitry indicating a number of instructions that entered a writeback stage of the pipelined processor after an instruction that caused the debug event until a predetermined point in instruction execution when a data value breakpoint is taken.

8. The system of claim 7 wherein the data value breakpoint is imprecise and the test circuitry further comprises a register having a bit field that indicates whether an imprecise data value breakpoint has occurred.

9. The system of claim 7 wherein the test circuitry further comprises a status register for indicating status information regarding events occurring between when the debug event occurs and when the data value breakpoint is taken.

10. The system of claim 9 wherein one of the events occurring between when the debug event occurs and when the data value breakpoint is taken further comprises a second debug event.

11. The system of claim 7 wherein the debug circuitry further comprises:
a counter for counting and providing a count value of the number of instructions that complete instruction execution following the instruction that caused the debug event.

12. The system of claim 7 wherein the debug circuitry further comprises:
a status debug register having a field for holding a value for indicating the number of additional instructions, if any, that complete instruction execution following the instruction that caused the debug event until the predetermined point in instruction execution when the data value breakpoint is taken.

13. A method comprising: executing a plurality of instructions by sequentially fetching, decoding, executing and writing results associated with execution of each instruction; monitoring execution of the instructions to determine when a debug event occurs; generating a debug exception to interrupt instruction processing flow; indicating a number of instructions that complete instruction execution by entering a write-back stage of a pipelined processor between an instruction that caused the debug event and a point in instruction execution when the debug exception in response to the debug event is taken; determining that a debug event has occurred in response to decoding one of the plurality of instructions; comparing an address formed by the pipelined processor with one or more predetermined debug addresses to determine if a data address match has occurred; and comparing a data value form by the pipelined processor with one or more predetermined data values to determine if a data value match has occurred, the debug event requiring a match of both comparing operations to occur.

14. The method of claim 13 further comprising:
counting and providing a count value of the number of instructions that complete instruction execution following the instruction that caused the debug event.

15. The method of claim 14 further comprising:
forming a count value that is greater than zero indicating that processing of the debug event is imprecise.

16. The method of claim 13 further comprising:
determining that one or more additional instructions that complete instruction execution following an instruction that caused the debug event also caused a debug event to occur.

17. The method of claim 13 further comprising:
determining that at least two instructions each cause a debug event; and
storing in differing counters a respective count value of a number of additional instructions that complete instruction execution following each of the at least two instructions.

18. The method of claim 13 further comprising:
providing a debug status register in the debug circuitry, the status register having a field for holding a value for indicating the number of additional instructions, if any, that complete instruction execution following the instruction that caused the debug event until the predetermined point in instruction execution when the debug exception is taken.

* * * * *